(12) United States Patent
Salkintzis et al.

(10) Patent No.: US 10,587,458 B2
(45) Date of Patent: Mar. 10, 2020

(54) USING RF ENERGY ON AN UPLINK CHANNEL TO TRANSITION AN UNPOWERED ACCESS POINT TO A POWER-UP STATE

(71) Applicant: Motorola Mobility LLC, Chicago, IL (US)

(72) Inventors: Apostolis K. Salkintzis, Athens (GR); Robert T. Love, Barrington, IL (US); Vahid Pourahmadi, Urbana, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/258,468

(22) Filed: Jan. 25, 2019

(65) Prior Publication Data
US 2019/0173742 A1 Jun. 6, 2019

Related U.S. Application Data

(62) Division of application No. 15/006,268, filed on Jan. 26, 2016, now Pat. No. 10,326,641.

(51) Int. Cl.
*H04L 12/24* (2006.01)
*H04L 12/26* (2006.01)
(Continued)

(52) U.S. Cl.
CPC .......... *H04L 41/0677* (2013.01); *H04L 43/16* (2013.01); *H04W 24/08* (2013.01);
(Continued)

(58) Field of Classification Search
CPC .............. H04L 41/0677; H04L 43/16; H04W 52/0206; H04W 52/34; H04W 52/146;
(Continued)

(56) References Cited

U.S. PATENT DOCUMENTS 6,141,763 A 10/2000 Smith et al.
8,902,830 B2 12/2014 Nimbalker et al.
(Continued)

FOREIGN PATENT DOCUMENTS

EP 2299759 A1 * 3/2011 ........ H04W 52/0229
EP 2299759 A1 3/2011
(Continued)

OTHER PUBLICATIONS

3GPP, 3rd Generation Partnership Project; Technical Specification Group Core Network and Terminals; access to the 3GPP Evolved Packet Core (EPC) via non-3GPP access networks; Stage 3 (Release 12), 3GPP TS 24.302 V12.8.0, Mar. 2015, pp. 1-104.
(Continued)

*Primary Examiner* — Minjung Kim
(74) *Attorney, Agent, or Firm* — Kunzler Bean & Adamson

(57) ABSTRACT

Apparatuses and methods are disclosed for using RF energy on an uplink channel to transition an unpowered access point to a power-up state. One apparatus includes a wake-up circuit that detects a radio frequency ("RF") data signal from a remote unit, harvests RF energy of the RF data signal, and determines a signal strength of the RF data signal. The apparatus includes a controller that activates a network interface to query a base unit for a wake-up confirmation message in response to the signal strength of the RF data signal exceeding a threshold power level, adjusts a wake-up configuration in response to not receiving the wake-up confirmation message, and transitions the apparatus from an unpowered state to a power-up state in response to receiving the wake-up confirmation message.

20 Claims, 10 Drawing Sheets

(51) Int. Cl.
*H04W 72/04* (2009.01)
*H04W 24/08* (2009.01)
*H04W 52/14* (2009.01)
*H04W 52/34* (2009.01)
*H04W 52/02* (2009.01)
*H04W 88/08* (2009.01)

(52) U.S. Cl.
CPC ..... *H04W 52/0206* (2013.01); *H04W 52/146* (2013.01); *H04W 52/34* (2013.01); *H04W 72/0413* (2013.01); *H04W 88/08* (2013.01); *Y02D 70/1262* (2018.01); *Y02D 70/142* (2018.01); *Y02D 70/146* (2018.01); *Y02D 70/164* (2018.01); *Y02D 70/168* (2018.01); *Y02D 70/26* (2018.01)

(58) Field of Classification Search
CPC . H04W 24/08; H04W 72/0413; H04W 88/08; Y02D 70/26; Y02D 70/146; Y02D 70/168; Y02D 70/142; Y02D 70/164; Y02D 70/1262
See application file for complete search history.

(56) References Cited

U.S. PATENT DOCUMENTS

| | | | |
|---|---|---|---|
| 10,326,641 | B2 | 6/2019 | Salkintzis et al. |
| 2008/0227454 | A1 | 9/2008 | Damnjanovic |
| 2010/0003985 | A1 | 1/2010 | Jang et al. |
| 2011/0130138 | A1 | 6/2011 | Lee et al. |
| 2012/0039195 | A1 | 2/2012 | Jung et al. |
| 2013/0028157 | A1 | 1/2013 | Ruster et al. |
| 2013/0143572 | A1 | 6/2013 | Kang et al. |
| 2013/0225215 | A1 | 8/2013 | Kolde |
| 2014/0003312 | A1 | 1/2014 | Sergeyev et al. |
| 2015/0009982 | A1 | 1/2015 | Oerton |
| 2015/0049649 | A1 | 2/2015 | Zhu et al. |
| 2015/0319689 | A1* | 11/2015 | Zhang ............... H04W 24/02 370/311 |
| 2015/0350988 | A1 | 12/2015 | Himayat et al. |
| 2016/0143035 | A1 | 5/2016 | Xue et al. |
| 2017/0086144 | A1* | 3/2017 | Hunukumbure .. H04W 52/0225 |

FOREIGN PATENT DOCUMENTS

| | | |
|---|---|---|
| EP | 2958378 A1 | 6/2014 |
| WO | 2014/056174 A1 | 4/2014 |
| WO | 2014086035 A1 | 6/2014 |

OTHER PUBLICATIONS

3GPP, Universal Mobile Telecommunications System (UMTS); LTE; architecture enhancements for non-3GPP accesses (3GPP TS 23.402 version 10.4.0 Relase 10), ETSI TS 123 402 V10.4.0, Jun. 2011, pp. 1-233.

P. Nintanavongsa et al., "Design Optimization and Implementation for RF Energy Harvesting Circuits", IEEE Journal on Emerging and Selected Topics in Circuits and Systems, vol. 2, No. 1, Mar. 2012, pp. 24-33.

T. Le, "Efficient Far-Field Radio Frequency Energy Harvesting for Passively Powered Sensor Networks", IEEE Journal of Solid-State Circuits, vol. 43, No. 5, May 2008, pp. 1287-1302.

H. Claussen, "Future Cellular Networks", Alcatel-Lucent, Apr. 1, 2012, pp. 1-28.

Ericsson, "WLAN/3GPP Radio Interworking—More on Idle and Connected mode solution", 3GPP TSG-RAN WG2 #82, R2-131886, May 20-24, 2013, pp. 1-10.

* cited by examiner

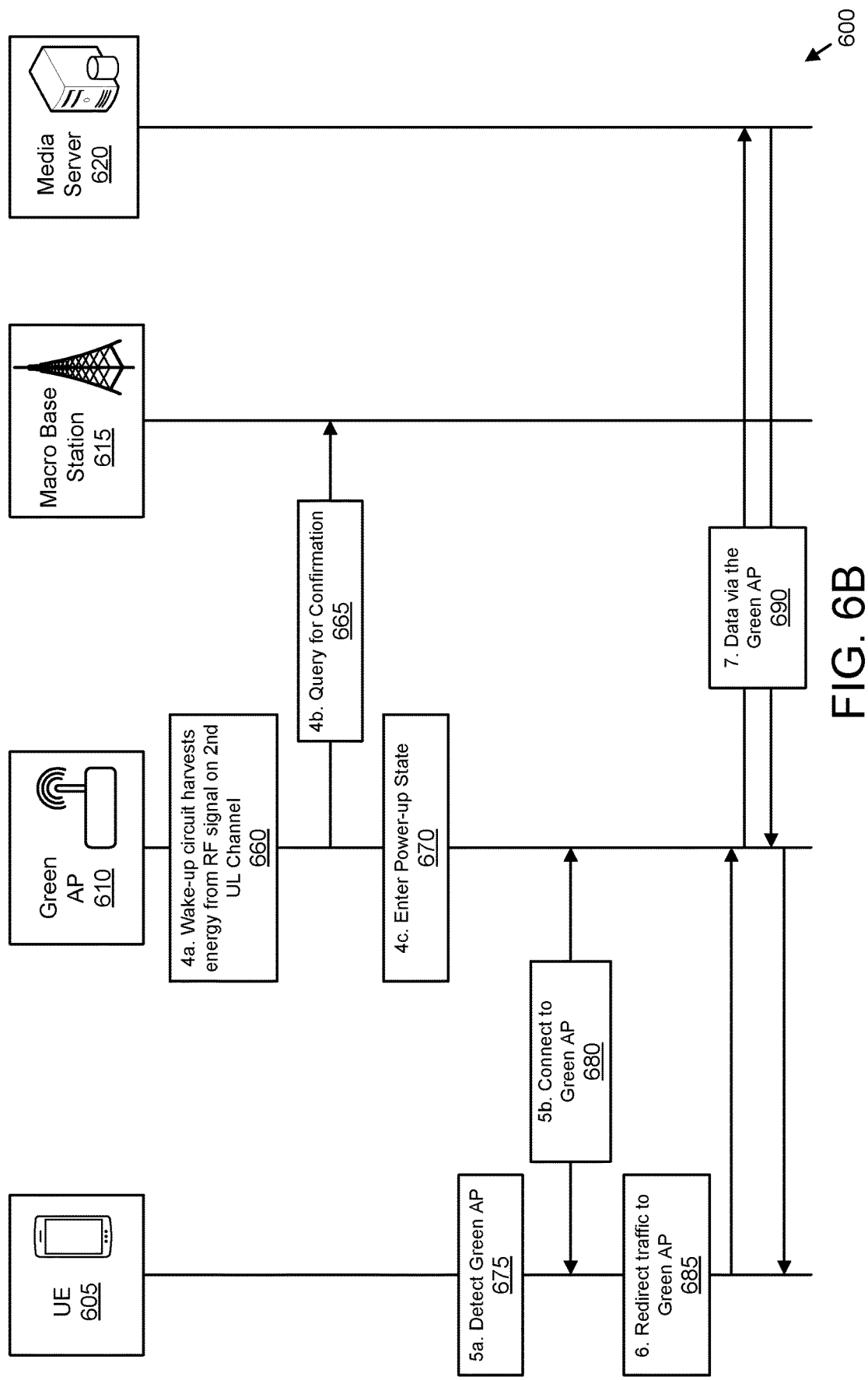

USING RF ENERGY ON AN UPLINK CHANNEL TO TRANSITION AN UNPOWERED ACCESS POINT TO A POWER-UP STATE

FIELD

The subject matter disclosed herein relates generally to wireless communications and more particularly relates to using RF energy on an uplink channel to transition an unpowered access point to a power-up state.

BACKGROUND

The following abbreviations are herewith defined, at least some of which are referred to within the following description.

3GPP Third Generation Partnership Project
4G Fourth Generation
5G Fifth Generation
ANDSF Access Network Discovery and Selection Function
AP Access Point
DL Downlink
eNB Evolved Node B
ETSI European Telecommunications Standards Institute
IP Internet Protocol
ISP Internet Service Provider
LAN Local Area Network
LTE Long Term Evolution
MME Mobility Management Entity
OFDM Orthogonal Frequency Division Multiplexing
PGW Packet Data Network Gateway
PLMN Public Land Mobile Network
RAN Radio Access Network
RF Radio Frequency
RRC Radio Resource Control
SC-FDMA Single Carrier Frequency Division Multiple Access
SGW Serving Gateway
UE User Entity/Equipment (Mobile Terminal)
UL Uplink
WAN Wide Area Network
WiMAX Worldwide Interoperability for Microwave Access
WoL Wake-on-LAN
WoWLAN Wake-on-Wireless LAN
WLAN Wireless Local Area Network In wireless communications networks, such as a 3GPP Long Term Evolution ("LTE") wireless communication network, current network architecture supports several procedures for offloading data traffic from the macro radio network. In one procedure, data traffic is offloaded to small cells by using the so-called dual-connectivity solution. In another procedure, data traffic is offloaded to wireless local area network ("WLAN") access points ("APs") by using either a core network method (e.g., an Access Network Discovery and Selection Function ("ANDSF") based WLAN interworking) or a radio network method (e.g., a Radio Access Network ("RAN") assisted WLAN interworking).

It is anticipated that "green" access points will play a key role in future wireless communication networks (e.g., fifth generation ("5G") and higher). A green access point (also described as a "green AP"), as used herein, refers to a wireless access node (e.g., a LTE small cell or a WLAN AP) which powers up only when it is needed to carry data traffic. In all other situations, the wireless access node is powered down and does not consume electric power. However, current network architectures do not support data offloading to green access points which remain unpowered until they are needed to carry data traffic.

In general, a green access point may be powered up by several alternative mechanisms. One well-known mechanism is the Ethernet Wake-on-LAN ("WoL") feature. In Ethernet WoL, the green AP is equipped with an Ethernet interface and is configured to wake up (e.g., to power up) after it receives a special packet, known as a "magic" packet. In some situations, the magic packet is a broadcast frame containing in its payload six bytes of 0xFF followed by sixteen repetitions of the green AP's Media Access Control ("MAC") address. In this case, the green AP must consume some amount of energy for receiving Ethernet traffic and looking for a magic packet.

Alternatively, the green AP may employ a Wake-on-Wireless LAN ("WoWLAN") mechanism. The WoWLAN mechanism is essentially the same as the Wake-on-LAN mechanism, but the green AP expects the magic packet from its WLAN interface instead of the Ethernet interface. When using the WoWLAN mechanism, the green AP must keep its WLAN receive circuit active in order to detect the magic packet. Thus, some amount of energy is again consumed.

Other wake-up mechanisms are also known, however, all these mechanisms (including the WoL and WoWLAN, described above) require that the green AP both keep some of its circuitry in operation (thus consuming some energy while being in a "power off" state) and support a special signaling method (e.g. receiving a magic packet) for being woken up.

BRIEF SUMMARY

Apparatuses for using RF energy on an uplink channel to transition an unpowered access point to a power-up state are disclosed. Methods and systems also perform the functions of the apparatus. In one embodiment, the apparatus includes a wake-up circuit that: detects a radio frequency ("RF") data signal from a remote unit, harvests radio frequency energy of the data signal, and determines a signal strength of the RF data signal, and a controller that: activates a network interface to query a base unit for a wake-up confirmation message in response to the signal strength of the RF data signal exceeding a threshold power level, adjusts a wake-up configuration in response to not receiving the wake-up confirmation message, and transitions the apparatus from an unpowered state to a power-up state in response to receiving the wake-up confirmation message.

In some embodiments, adjusting the wake-up configuration in response to not receiving the wake-up confirmation message includes adjusting the threshold power level. In certain embodiments, the controller further activates a network interface to query, at predefined intervals, a base unit for a missed wake-up message, the apparatus querying the base unit while in a diagnostic state. The controller may further adjust a wake-up configuration in response to receiving a missed wake-up message from the base unit. In one embodiment, adjusting a wake-up configuration in response to receiving a missed wake-up message includes performing a diagnostic check on the wake-up circuit. In another embodiment, adjusting a wake-up configuration in response to a missed wake-up message includes adjusting the threshold signal strength.

In some embodiments, the controller further detects a failure state of the wake-up circuit and controls the network interface to transmit an error state message to the base unit.

The controller may further control the network interface to receive a response from the base unit and set an operation state based on the response. In one embodiment, detecting the failure state the wake-up circuit includes performing a diagnostic check on the wake-up circuit and determining a failure state based on the result of the diagnostic check. In another embodiment, detecting the failure state of the wake-up circuit includes tracking a number of missed wake-up signals over a predetermined amount of wake-up attempts and determining failure state of the wake-up circuit in response to the number of missed wake-up signals over a predetermined amount of wake-up attempts exceeding a threshold amount.

A method for using RF energy on an uplink channel to transition an unpowered access point to a power-up state, in one embodiment, includes detecting a radio frequency ("RF") data signal from a remote unit, the data signal transmitted on an uplink channel, powering a wake-up circuit using radio frequency energy of the RF data signal, determining, by the wake-up circuit, a signal strength of the RF data signal, querying a base unit for a wake-up confirmation message in response to the received data signal exceeding a threshold signal strength, transitioning an access point from an unpowered state to a power-up state in response to receiving a wake-up confirmation message from the base unit, and adjusting a configuration of the wake-up circuit in response to not receiving the wake-up confirmation message.

In some embodiments, adjusting a wake-up configuration in response to not receiving the wake-up confirmation message includes adjusting the threshold signal strength. In certain embodiments, the method includes querying, at predetermined intervals, a base unit for a missed wake-up message, wherein querying the base unit includes querying the base unit while in a diagnostic state, and adjusting a wake-up configuration in response to receiving a missed wake-up message from the base unit. In one embodiment, adjusting a wake-up configuration in response to a missed wake-up message includes performing a diagnostic check on the wake-up circuit. In another embodiment, adjusting a wake-up configuration in response to receiving a missed wake-up message includes adjusting the threshold signal strength.

In some embodiments, the method includes detecting a failure state of the wake-up circuit, transmitting and error state message to the base unit, receiving a response from the base unit, and setting an operation state of the access point based on the response. In one embodiment, detecting the failure state of the wake-up circuit includes performing a diagnostic check on the wake-up circuit and determining the failure state based on a result of the diagnostic check. In another embodiment, detecting the failure state of the wake-up circuit includes tracking a number of missed wake-up signals over a predetermined amount of wake-up attempts and determining a failure state of the wake-up circuit in response to the number of missed wake-up signals over the predetermined amount of wake-up attempts exceeding a threshold amount.

Another apparatus for using RF energy on an uplink channel to transition an unpowered access point to a power-up state includes a radio transceiver that communicates with a base unit using a first uplink channel, and a processor that: determines whether to move data traffic from a base unit to a nearby access point, wherein the access point transitions to a power-up state after harvesting radio energy transmitted on a second uplink channel, requests, from the base unit, allocation of uplink resources on the second uplink channel in response to determining to move data traffic to the access point, controls the radio transceiver to communicate with the base unit using the second uplink channel, in response to the base unit allocating of uplink resources on a second uplink channel, detects the access point, and controls the radio transceiver to establish a connection with the access point.

In certain embodiments, the processor further redirects data communications from the base unit to the access point in response to the apparatus establishing a connection with the access point. In some embodiments, the apparatus further includes a location sensor that determines a current location of the apparatus, wherein determining whether to move data traffic to the access point includes: comparing a current location to a location of the access point and determining to move data traffic to the access point in response to the current location being within a predetermined distance of the access point.

In some embodiments, the apparatus further includes a memory storing a database of access point locations, wherein comparing a current location to a location of the access point includes accessing the database to identify a location of the access point. In certain embodiments, the memory further stores a second uplink channel for each access point in the database of access point locations. In one embodiment, establishing a connection with the access point includes communicating with the access point over unlicensed radio spectrum Another method for using RF energy on an uplink channel to transition an unpowered access point to a power-up state includes communicating with a base unit using a first uplink channel, determining whether to move data traffic from the base unit to a nearby access point, wherein the access point transitions to power-up state after harvesting radio energy transmitted on a second uplink channel, requesting, from the base unit, allocation of uplink resources on a second uplink channel in response to determining to move data traffic to the access point, communicating using the second uplink channel in response to the base unit allocating of uplink resources on a second uplink channel, detecting the access point, and establishing a connection via with the access point.

In one embodiment, the method further includes redirecting data communications from the base unit to the access point in response to establishing a connection with the access point. In certain embodiments, determining whether to move data traffic to the access point includes comparing a current location to a location of the access point and determining to move data traffic to the access point in response to the current location being within a predetermined distance of the access point.

In one embodiment, comparing a current location to a location of the access point includes accessing a database to identify a location of the access point. In a further embodiment, the database also stores an activation channel for each access point in the database of access point locations, wherein requesting allocation of uplink resources on a second uplink channel includes requesting uplink resources on the activation channel corresponding to the access point. In some embodiments, establishing a connection with the access point includes communicating with the access point over unlicensed radio spectrum.

Another apparatus for using RF energy on an uplink channel to transition an unpowered access point to a power-up state includes a radio transceiver that communicates with a remote unit, and a processor that: receives, via the radio transceiver, uplink data from the remote unit over a first uplink channel, determines whether to offload the data traffic of remote unit to an access point, where the access point transitions to power-up state after harvesting radio energy from a second uplink channel, and allocates uplink resources to the remote unit on a second uplink channel in response to determining to offload the data traffic of remote unit to the access point.

In some embodiments, determining whether to offload the data traffic to the access point includes comparing a rate of received data traffic to a threshold traffic rate and determining to offload the data traffic to the access point in response to the rate of received data traffic exceeding the threshold traffic rate. In certain embodiments, determining whether to offload traffic to the access point further includes receiving a location of the remote unit and determining to offload the data traffic to the access point in response to the remote unit being within a predetermined distance of the access point.

In some embodiments, the processor further receives, via the radio transceiver, a request from the remote unit to allocate uplink resources on the second uplink channel, wherein the processor allocates uplink resources on the second uplink channel to the remote unit in response to the request. In one embodiment, the apparatus includes a network interface that communicates with the access point, wherein the processor receives, via the network interface, a wake-up confirmation query from the access point and controls the network interface to send a wake-up confirmation message to the access point in response to allocating uplink resources to the remote unit on the second uplink channel. In another embodiment, the apparatus includes a network interface that communicates with the access point, wherein the processor further receives, via the network interface, a missed wake-up query from the access point, determines whether the access point failed to send a wake-up confirmation query within a predetermined amount of time after allocating uplink resources on the second uplink channel, and controls the network interface to send a missed wake-up message to the access point in response to the access point failing to send a wake-up confirmation query within a predetermined amount of time.

Another method for using RF energy on an uplink channel to transition an unpowered access point to a power-up state includes receiving uplink data from a remote unit over a first uplink channel, determining whether to offload the data traffic of the remote unit to an access point, where the access point transitions to power-up state after harvesting radio energy from a second uplink channel, and allocating uplink resources to the remote unit on a the second uplink channel in response to determining to offload the data traffic of remote unit to the access point.

In some embodiments, determining whether to offer the data traffic of the remote unit the access point includes comparing a rate of received data traffic to a threshold traffic rate and determining to offload the data traffic to the access point in response to the rate of received data traffic exceeding the threshold traffic rate. In certain embodiments, determining whether to offload the data traffic of the remote unit to the access point further includes receiving a location of the remote unit and determining to offload the data traffic of the remote unit to the access point in response to the remote unit being within a predetermined distance of the access point.

In some embodiments, the method includes receiving, from the remote unit, a request to allocate uplink resources on the second channel and allocating, to the remote unit, uplink resources on the second uplink channel in response to receiving the request. In certain embodiments, the method includes receiving a wake-up confirmation query from the access point and sending a wake-up confirmation message to the access point in response to allocating uplink resources to the remote unit on the second uplink channel. In certain embodiments, the method includes receiving a missed wake-up query from access point, determining whether the access point failed to send a wake-up confirmation query within a predetermined amount of time after allocating uplink resources to the mode unit on the second of the channel, and sending a missed wake-up message the access point in response to the access point failing to send a wake-up confirmation query within the predetermined amount of time.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6B is a block diagram illustrating an embodiment of a procedure used for offloading traffic to green access points in a wireless communication system, FIG. 6B being a continuation of FIG. 6A;

DETAILED DESCRIPTION

Figure 1:
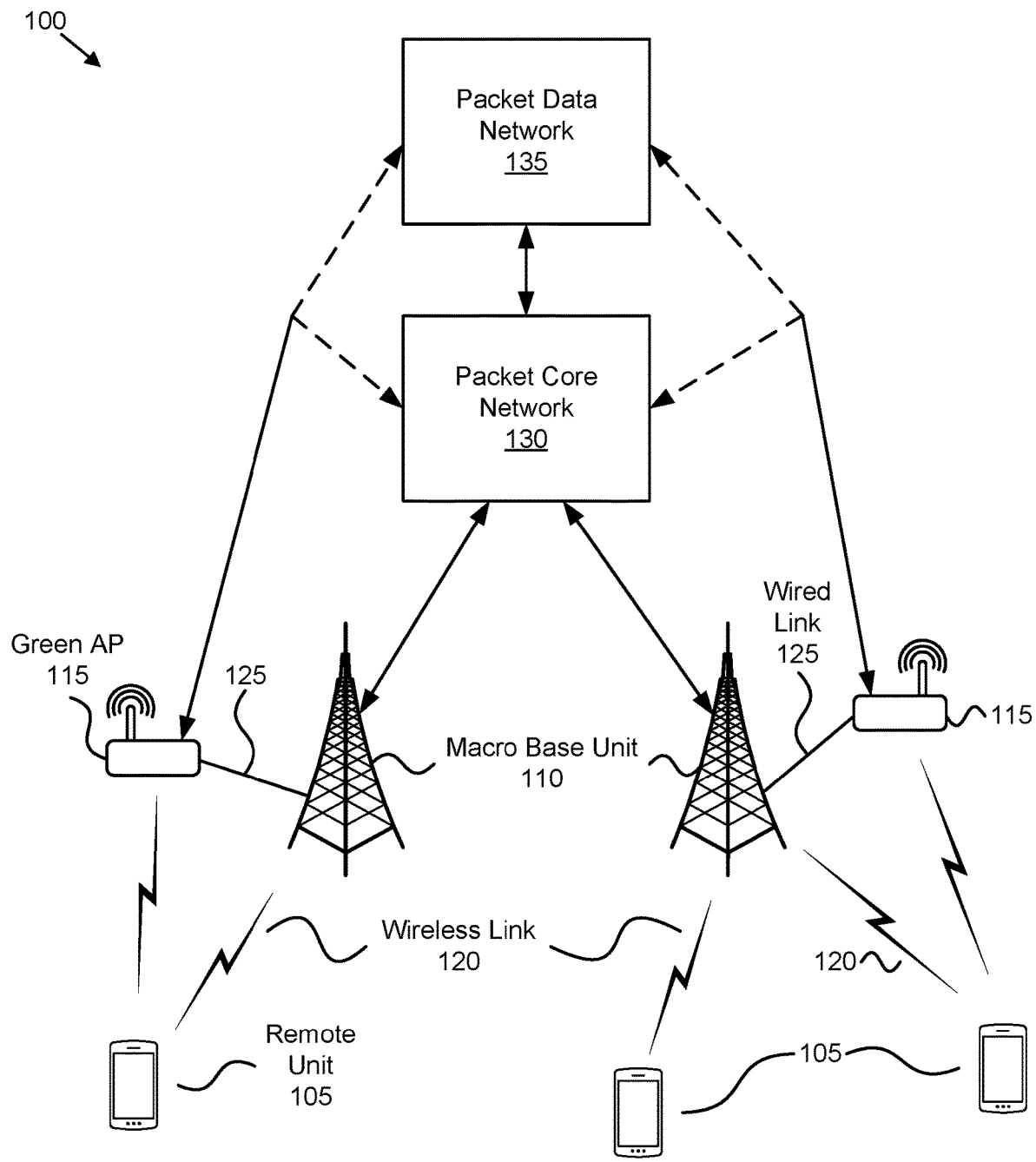
FIG. 1 is a schematic block diagram illustrating one embodiment of a wireless communication system for offloading traffic to green access points.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider ("ISP")).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

In order to offload data traffic to green access point, one or more green access points are deployed in strategic locations within a radio access network ("RAN"), wherein remote units primarily communicate with base units in the RAN using a first uplink channel. The green access points do not consume power well-being in an unpowered state and, further, do not require any special signaling or protocol for being woken up. Instead, the disclosed green access points include a wake-up circuit (also referred to as a wake-up receiver) configured to harvest energy from uplink communication signals, specifically from uplink signals transmitted by remote units on a second uplink channel, wherein the green access points transition to a powered up state after receiving an RF signal with enough power (e.g., a wake-up signal) on the second uplink channel.

Each green access point may be configured to provide conductivity to packet data servers (e.g., media servers) in a packet data network, whereby the base units may offload data traffic to the green access points. The green access points may further be configured to automatically adjust the sensitivity of the wake-up circuit to minimize both false detection of the wake-up signal and false rejection of the wake-up signal.

FIG. 1 depicts a wireless communication system 100 for offloading traffic to green access points, according to embodiments of the disclosure. In one embodiment, the wireless communication system 100 includes remote units 105, macro base units 110, green access points 115, and wireless communication links 120. Even though a specific number of remote units 105, macro base units 110, green access points 115, and wireless communication links 120 are depicted in FIG. 1, one of skill in the art will recognize that any number of remote units 105, macro base units 110, green access points 115, and wireless communication links 120 may be included in the wireless communication system 100.

In one embodiment, the remote units 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with a macro base unit 110 and/or green AP 115 via uplink ("UL") communication signals. Furthermore, the UL communication signals may be carried over the wireless communication links 120.

The macro base units 110 may be distributed over a geographic region. In certain embodiments, a macro base unit 110 may also be referred to as an access point, an access terminal, a base, a base station, a macrocell, a Node-B, an eNB, a Home Node-B, a relay node, a device, or by any other terminology used in the art. The macro base units 110 are generally part of a radio access network that may include one or more controllers communicably coupled to one or more corresponding macro base units 110.

The macro base units 110 are generally communicably coupled to one or more packet core networks (PCN) 130, which may be coupled to other networks, like the packet data network ("PDN") 135 (e.g., the Internet) and public switched telephone networks, among other networks. These and other elements of radio access and core networks are not illustrated but are well known generally by those having ordinary skill in the art. For example, one or more macro base units 110 may be communicably coupled to a mobility management entity ("MME"), a serving gateway ("SGW"), and/or a packet data network gateway ("PGW").

The macro base units 110 may serve a number of remote units 105 within a serving area, for example, a cell or a cell sector via a wireless communication link. The macro base units 110 may communicate directly with one or more of the remote units 105 via communication signals. Similarly, the green APs 115 may serve a number of remote units 105 within a serving area. Typically, the green APs 115 serve remote units 105 within a smaller serving area (e.g., a smaller cell) then the macro base units 110. For example, a macro base unit 110 may serve remote units 105 within a macrocell, while one or more green APs 115 may serve remote units 105 within one or more microcells (or picocells or femtocells) which reside within the macrocell. Thus, in this example, the macro base unit 110 may offload data traffic to the one or more green APs 115 which serve microcells within the macrocell of the macro base unit 110.

The macro base units 110 and green APs 115 transmit downlink ("DL") communication signals to serve the remote units 105 in the time, frequency, and/or spatial domain.

Furthermore, the DL communication signals may be carried over the wireless communication links 120. The wireless communication links 120 may be any suitable carrier in licensed or unlicensed radio spectrum. The wireless communication links 120 facilitate communication between the remote units 105 and the macro base units 110 and/or green APs 115.

The green access points 115 may be distributed over a geographic region. In certain embodiments, a green access point 115 may also be referred to as an access point, an access terminal, a base, a base station, a microcell, a picocell, a femtocell, a Node-B, an eNB, a Home Node-B, a relay node, a device, or by any other terminology used in the art. The green access points 115 are generally part of a radio access network that may include one or more controllers communicably coupled to one or more corresponding green access points 115.

In some embodiments, the green access points 115 communicate with the remote units 105 over licensed radio spectrum. For example, the green access points 115 may be microcells, picocells, femtocells, or the like controlled by the same network operators as the macro base units 110. Accordingly, the green access points 115 may communicate with the remote units 105 using the same communication protocols as employed by the macro base units 110. In other embodiments, however, the green access points 115 may can indicate with the remote units 105 over unlicensed radio spectrum. For example, the green access points 115 may be Wi-Fi access points which communicate with the remote units 105 over industrial, scientific, and medical ("ISM") radio bands.

The green access points 115 are generally communicably coupled to one or more additional networks. In one embodiment, the green access points 115 may be coupled to the PCN 130, such that conductivity to packet data servers in the PDN 135 occurs by traversing the PCN 130. Alternatively, in another embodiment the green access points 115 may be coupled to the PDN 135 without traversing the PCN 130. The green access point 115 may be coupled to other networks as known generally by those having ordinary skill in the art.

Each green AP 115 is completely power down (e.g., consumes no power) when it does not need to provide radio connectivity to any remote unit 105. However, when decided by a macro base unit 110, a green AP 115 can be powered up and serve one or more remote units 105 and its vicinity by providing an alternative communication path to the PDN 135. This enables the macro base unit 110 to offload some data traffic to the green AP 115 and to retain wide area rater resources that can be used to serve other remote units 105 which are not close to a green AP 115.

Each green AP 115 includes an energy harvesting wake-up receiver (also referred to as a wake-up circuit) for powering up the green AP 115 after receiving an RF signal on a specific RF channel with sufficient power, referred to as a wake-up signal. The green AP 115 harvests its energy from the RF energy of the wake-up signal and therefore does not need an external power source to receive the wake-up signal and transition to the power-up state. After a threshold period of inactivity (or in response to a power down command from a macro base unit 110), the green access points 115 return to the unpowered state, thereby minimizing energy consumption. As used herein, "energy harvesting" refers to extracting power from RF signals, for example RF signals at a particular frequency. An energy harvesting circuit, such as the energy harvesting wake-up receiver, converts the RF signals into electricity, for example using a rectifying antenna tuned to the particular frequency. The energy harvesting circuit may rectify a received RF signal to power a comparator in order to determine whether the RF signal exceeds a threshold signal strength (or threshold power level).

In some embodiments, the green AP 115 may adjust power thresholds or other configurations of the wake-up receiver in order to optimize the wake-up reliability of the green AP 115. For example, the green AP 115 may increase the sensitivity of the wake-up receiver if it determines that it has missed a wake-up signal. As another example, the green AP 115 may decrease the sensitivity of the wake-up receiver if it determines that it falsely detected a wake-up signal (e.g., woke up due to spurious RF signals). In order to optimize its wake-up reliability, the system 100 includes a wired link 125 between the green AP 115 and a macro base unit 110, wherein the green AP 115 resides within the coverage of the macro base unit 110 with which it has a wired link 125. Thus, the green AP 115 may communicate with the macro base unit 110 over the wired link 125 in order to improve its wake-up reliability, as discussed in further detail below.

In one implementation, the wireless communication system 100 is compliant with the long-term evolution ("LTE") of the 3GPP protocol, wherein the macro base unit 110 transmits using an orthogonal frequency division multiplexing ("OFDM") modulation scheme on the DL and the remote units 105 transmit on the UL using a single-carrier frequency division multiple access ("SC-FDMA") scheme. More generally, however, the wireless communication system 100 may implement some other open or proprietary communication protocol, for example, WiMAX, among other protocols.

In certain embodiments, the green APs 115 may also communicate with remote units 105 using the LTE protocol. In other embodiments, the green APs 115 may communicate using other communication protocols, such as the IEEE 802.11 family of wireless communication protocols. Further, in some embodiments the green APs 115 may communicate over licensed spectrum, while in other embodiments the green APs 115 communicate over unlicensed spectrum. The present disclosure is not intended to be limited to the implementation of any particular wireless communication system architecture or protocol.

Figure 2:
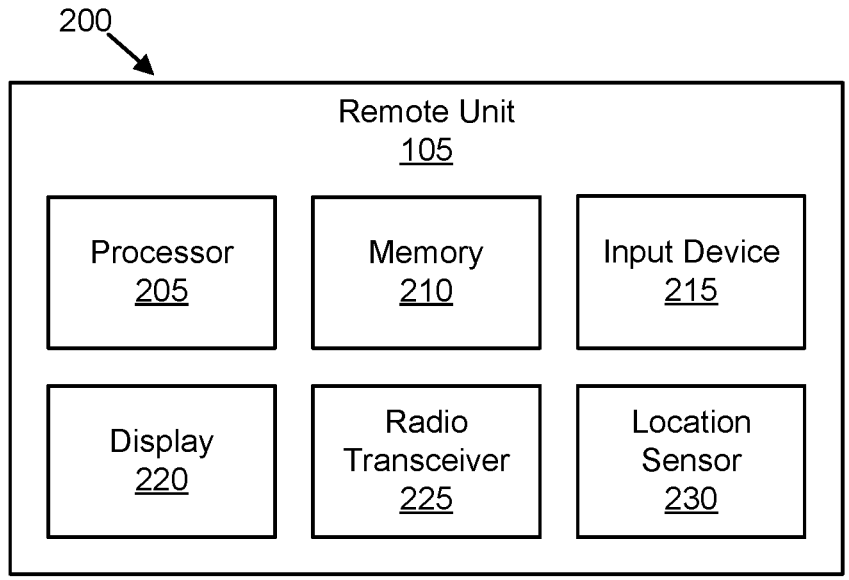
FIG. 2 is a schematic block diagram illustrating one embodiment of an apparatus that may be used for using RF energy on an uplink channel to transition an unpowered access point to a power-up state.

FIG. 2 depicts an apparatus 200 for using RF energy on an uplink channel to transition an unpowered access point to a power-up state, according to embodiments of the disclosure. The apparatus 200 includes one embodiment of the remote unit 105. Furthermore, the remote unit 105 may include a processor 205, a memory 210, an input device 215, a display 220, a radio transceiver 225, and a location sensor 230. In some embodiments, the input device 215 and the display 220 are combined into a single device, such as a touchscreen. In certain embodiments, the remote unit 105 may not include any input device 215 and/or display 220. In various embodiments, the remote unit 105 may include one or more of the processor 205, the memory 210, and the radio transceiver 225, and may not include the input device 215 and/or the display 220.

The processor 205, in one embodiment, may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 205 executes instructions stored in the memory 210 to perform the methods and routines described herein. The processor 205 is communicatively coupled to the memory 210, the input device 215, the display 220, the radio transceiver 225, and the location sensor 230. In certain embodiments, the processor 205 may identify a current location of the remote unit 105 (e.g., via the location sensor 230) and control the radio transceiver 225 to request uplink resources on a second uplink channel in response to the remote unit 105 being within the coverage area of a green AP 115.

The memory 210, in one embodiment, is a computer readable storage medium. In some embodiments, the memory 210 includes volatile computer storage media. For example, the memory 210 may include a RAM, including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media. In some embodiments, the memory 210 stores data relating to a category selection policy. In some embodiments, the memory 210 also stores program code and related data, such as an operating system or other controller algorithms operating on the remote unit 105.

In some embodiments, the memory 210 may contain a database of information relating to the green APs 115, referred to as a "green AP database." In certain embodiments, the apparatus 200 may be provisioned with the green AP database by a network operator (e.g., PLMN), a macro base unit 110, or the like. In some embodiments, the apparatus 200 may generate the green AP database and/or modify the green AP database as detects and/or connects to green APs 115.

Entries of the green AP database may include a location (e.g., global coordinates) of a green AP 115, such as a green AP 115 with which the apparatus 200 has previously communicated. In some embodiments, entries of the green AP database may also include an uplink channel (or activation frequency) for each green AP 115. In further embodiments, entries of the green AP database may also include a coverage area or range for each green AP 115. The processor 205 may access the green AP database and compare the current location (e.g., as measured by the location sensor 230) of the apparatus 200 to the location stored in the green AP database in order to determine whether the apparatus 200 is within range of a green AP 115.

The input device 215, in one embodiment, may include any known computer input device including a touch panel, a button, a keyboard, a stylus, a microphone, or the like. In some embodiments, the input device 215 may be integrated with the display 220, for example, as a touchscreen or similar touch-sensitive display. In some embodiments, the input device 215 includes a touchscreen such that text may be input using a virtual keyboard displayed on the touchscreen and/or by handwriting on the touchscreen. In some embodiments, the input device 215 includes two or more different devices, such as a keyboard and a touch panel.

The display 220, in one embodiment, may include any known electronically controllable display or display device. The display 220 may be designed to output visual, audible, and/or haptic signals. In some embodiments, the display 220 includes an electronic display capable of outputting visual data to a user. For example, the display 220 may include, but is not limited to, an LCD display, an LED display, an OLED display, a projector, or similar display device capable of outputting images, text, or the like to a user. As another, non-limiting, example, the display 220 may include a wearable display such as a smart watch, smart glasses, a heads-up display, or the like. Further, the display 220 may be a component of a smart phone, a personal digital assistant, a television, a table computer, a notebook (laptop) computer, a personal computer, a vehicle dashboard, or the like.

In certain embodiments, the display 220 includes one or more speakers for producing sound. For example, the display 220 may produce an audible alert or notification (e.g., a beep or chime). In some embodiments, the display 220 includes one or more haptic devices for producing vibrations, motion, or other haptic feedback. In some embodiments, all or portions of the display 220 may be integrated with the input device 215. For example, the input device 215 and display 220 may form a touchscreen or similar touch-sensitive display. In other embodiments, the display 220 may be located near the input device 215.

The radio transceiver 225 communicates with the mobile communication network using radio frequency signals. The radio transceiver 225 includes at least one transmitter used to provide UL communication signals to the macro base unit 110 and at least one receiver is used to receive DL communication signals from the macro base unit 110. In one embodiment, the radio transceiver 225 transmits uplink signals over a first or second uplink channel and receives downlink signals on at least a first downlink channel.

The radio transceiver 225 may include any suitable number of transmitters and receivers. The transmitter and the receiver may be any suitable type of transmitters and receivers. For example, in some embodiments, the radio transceiver 225 includes a plurality of transmitter and receiver pairs for communicating on a plurality of wireless networks and/or radio frequency bands, each transmitter and receiver pair configured to communicate on a different wireless network and/or radio frequency band than the other transmitter and receiver pairs.

The location sensor 230 measures a current location of the apparatus 200. In some embodiments, the location sensor 230 comprises a satellite receiver for receiving one or more location determination signals from a satellite (and/or ground-based transmitter), for example over satellite radio frequencies. Examples of location sensors 230 include, but are not limited to, a GPS receiver, a GLONASS receiver, a Galileo positioning system receiver, an Indian Regional Navigation Satellite System receiver, a BeiDou Navigation Satellite System receiver, a Quasi-Zenith Satellite System receiver, and other global navigation satellite system receivers. In certain embodiments, the location sensor 230 may include an inertial measurement unit or similar device for measuring the current location using dead reckoning.

Figure 3:
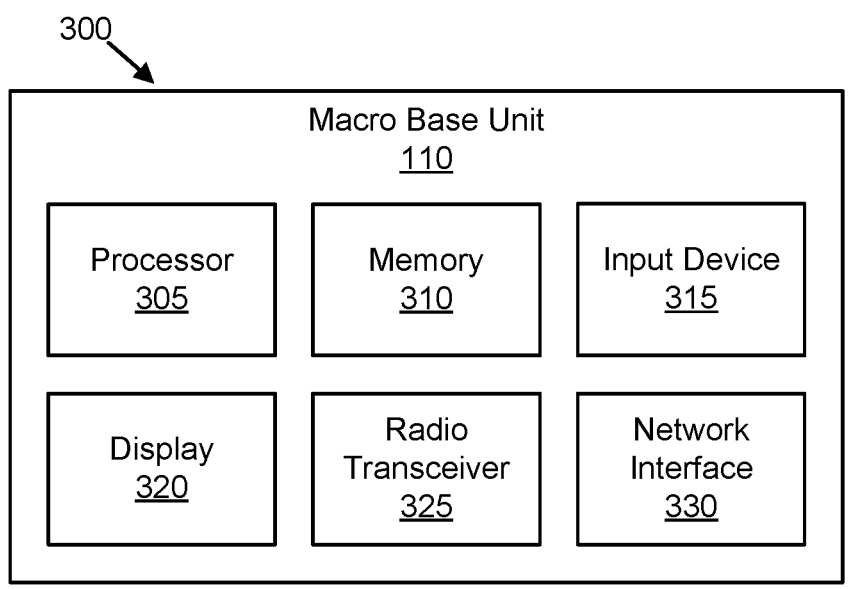
FIG. 3 is a schematic block diagram illustrating one embodiment of another apparatus that may be used for using RF energy on an uplink channel to transition an unpowered access point to a power-up state.

FIG. 3 depicts an apparatus 300 for using RF energy on an uplink channel to transition an unpowered access point to a power-up state, according to embodiments of the disclosure. The apparatus 300 includes one embodiment of the macro base unit 110. Furthermore, the macro base unit 110 may include a processor 305, a memory 310, an input device 315, a display 320, a radio transceiver 325, and a network interface 330. As may be appreciated, the processor 305, the memory 310, the input device 315, and the display 320 may be substantially similar to the processor 205, the memory 210, the input device 215, and the display 220 of the apparatus 200, respectively.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, the radio transceiver 325, and the network interface 330. In certain embodiments, the processor 305 may be used to determine whether to offload data traffic for a remote unit 105 to a green AP 115 near the remote unit 105. In a further embodiment, the processor 305 may be used to determine whether the remote unit 105 is within the coverage area of the green AP 115.

In some embodiments, the processor 305 controls the transceiver 325 to transmit DL signals to a remote unit 105. The processor 305 may also control the radio transceiver 325 to receive UL signals from the remote unit 105. For example, the processor 305 may control the radio transceiver 325 to receive uplink communications from a remote unit 105 and transmit downlink communication to the remote unit 105. As another example, the processor 305 may control the radio transceiver 325 to allocate uplink resources on a second uplink channel to the remote unit 105. In some embodiments, the processor 305 may compare a rate of received data traffic to a threshold traffic rate and determine to offload the data traffic to a green AP 115 in response to the rate of received data traffic exceeding the threshold traffic rate. In certain embodiments, the processor 305 may determine to offload the data traffic to the green AP 115 only in response to the remote unit being within a predetermined distance of the green AP 115.

The radio transceiver 325, in one embodiment, is configured to communicate wirelessly with the remote unit 105. In certain embodiments, the radio transceiver 325 comprises a transmitter used to transmit downlink communication signals to the remote unit 105 and a receiver used to receive downlink communication signals from the remote unit 105. For example, the receiver may receive from a remote unit 105 a request allocate uplink resources on the second uplink channel.

The radio transceiver 325 may communicate simultaneously with a plurality of remote units 105. For example, the transmitter may transmit DL communication signals to be received by multiple remote units 105. As another example, the receiver may simultaneously receive UL communication signals from multiple remote units 105. The radio transceiver 325 may include any suitable number and any suitable types of transmitters and receivers. Upon connecting with a remote unit 105, the macro base unit 110 may relay data between the remote unit 105 and the packet core 130 (or PDN 135) via the radio transceiver 325 and the network interface 330.

The network interface 330, in one embodiment, is configured to communicate with the green access points 115 over a wired link 125. For example, the processor 305 may receive, via the network interface 330, a wake-up confirmation query from the green AP 115. The processor 305 may check whether uplink resources were allocated on the second uplink channel within a predetermined amount of time prior to receiving the wake-up confirmation query and control the network interface 330 to send a wake-up confirmation message to the green AP 115 if uplink resources were allocated on the second uplink channel within a predetermined amount of time. Otherwise, if no uplink resources were allocated on the second uplink channel within the predetermined amount of time prior to receiving the wake-up confirmation query, the processor 305 may control the network interface 330 to send a negative confirmation message to the green AP 115.

In another embodiment, the processor 305 may receive, via the network interface 330, a missed wake-up query from the green AP 115. In response, the processor 305 may determine whether the green AP 115 failed to send a wake-up confirmation query within a predetermined amount of time after the macro base unit 110 allocated uplink resources on the second uplink channel to the remote unit 105, thereby indicating that the green AP 115 missed (or falsely rejected) a wake-up signal. The processor 305 may then control the network interface 330 to send a missed wake-up message to the access point in response to the access point failing to send a wake-up confirmation query within a predetermined amount of time. Alternatively, the network interface 330 may indicate to the green AP 115 that no messages were missed.

Figure 4:
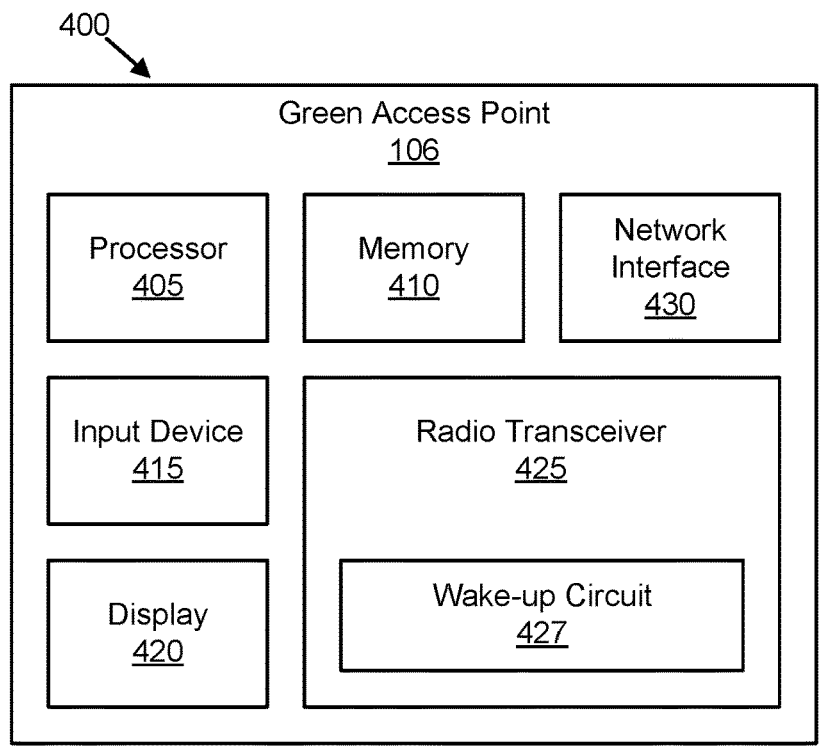
FIG. 4 is a schematic block diagram illustrating one embodiment of yet another apparatus that may be used for using RF energy on an uplink channel to transition an unpowered access point to a power-up state.

FIG. 4 depicts an apparatus 400 for using RF energy on an uplink channel to transition an unpowered access point to a power-up state, according to embodiments of the disclosure. The apparatus 400 includes one embodiment of the green access point 115. Furthermore, the green access point 115 may include a processor 405, a memory 410, an input device 415, a display 420, a radio transceiver 425, a wake-up circuit 427, and a network interface 430. As may be appreciated, the processor 405, the memory 410, the input device 415, the display 420, the transceiver 425, and the network interface 430 may be substantially similar to the processor 305, the memory 310, the input device 315, the display 320, the transceiver 325, and the network interface 330 of the apparatus 300, respectively.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, the radio transceiver 425, the wake-up circuit 427, and the network interface 430. In some embodiments, the processor 405 controls the transceiver 425 to transmit DL signals to a remote unit 105. The processor 405 may also control the radio transceiver 425 to receive UL signals from the remote unit 105. For example, the processor 405 may control the radio transceiver 425 to broadcast a beacon signal that can be done detected by nearby devices. The processor 405 may further control the radio transceiver 425 to establish the wireless connection with a remote unit 105.

In certain embodiments, the memory 410 may store statistics relating to the reliability of the wake-up circuit 427. For example, the processor 405 may track a number of missed wake-up signals over a predetermined amount of wake-up attempts (e.g., a predefined window) and store this in the memory 410. Accordingly, the processor 405 may determine a failure state of the wake-up circuit 427 based on the reliability statistics. For example, the processor 405 may determine the wake-up circuit 427 to be in a failure state in response to the number of missed wake-up signals over a predetermined amount of wake-up attempts exceeding a threshold amount.

The wake-up circuit 427, in one embodiment, is configured to harvest RF energy from RF signals on a specific RF channel (e.g., RF signals on an activation channel). When the wake-up circuit 427 receives an RF signal with enough power (e.g., greater than a threshold signal strength or power level), then the wake-up circuit 427 determines as received a wake-up signal and proceeds to activate the green AP 115. In some embodiments, the threshold signal strength or power level is configurable, such that the processor 405 may adjust the sensitivity of the wake-up circuit 427 by adjusting the threshold signal strength or power level. For example, if the wake-up circuit 427 falsely detects a wake-up signal, then the processor 405 may increase the threshold signal strength (or power level), thereby reducing the sensitivity of the wake-up circuit 427. As another example, if the wake-up circuit 427 falsely rejects a wake-up signal, then the processor 405 may decrease the threshold signal strength (or power level), thereby increasing the sensitivity of the wake-up circuit 427.

Figure 5A:
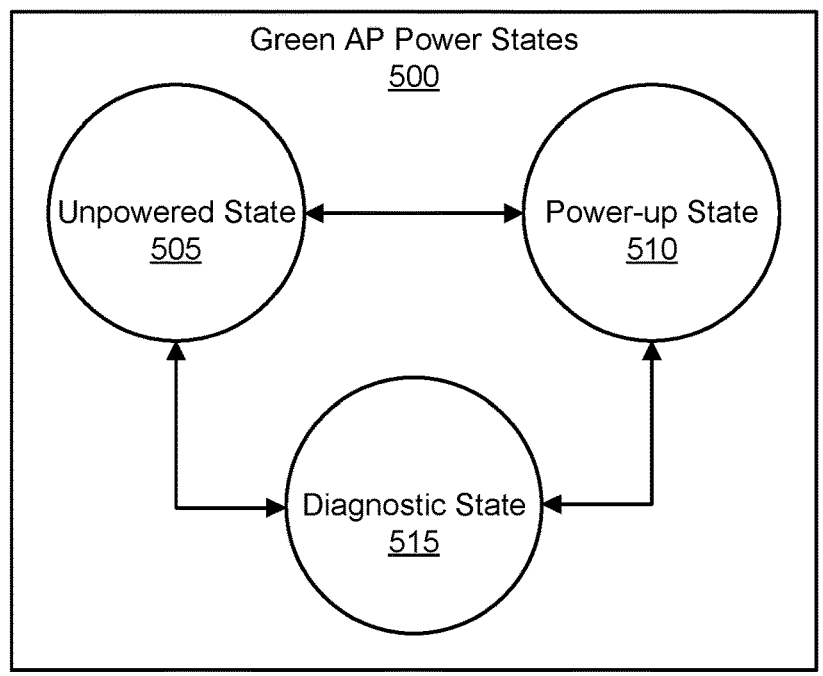
FIG. 5A is a state diagram illustrating one embodiment of access point power states used for offloading traffic to green access points.

FIG. 5A is a schematic state diagram illustrating different power states 500 for a green AP 115, such as the green AP 115 and/or the apparatus 400 described above with reference to FIGS. 1 and 4. After initializing, the green AP 115 may be in an unpowered state 505. While in the unpowered state 505, the radio transceiver 425 is powered down (e.g., deactivated). In further embodiments, the processor 405, the input device 415, the display 420, and/or the network interface 430 may also be powered down while the green AP 115 is in the unpowered state 505. Thus, in one embodiment, the unpowered state 505 is a "zero-power" state characterized by no energy consumption by the green AP 115. In other embodiments, the processor 405 and/or the network interface 430 may be in a low powered (e.g., "sleep") state while the green AP 115 is in the unpowered state 505.

From the unpowered state 505, the green AP 115 may transition to a power-up state 510. For example, the wake-up circuit 427 may harvest energy from a radio frequency ("RF") signal at a specific frequency (e.g., the second of the channel) and trigger the green AP 115 to transition to the power-up state 510 in response to the energy-harvesting RF signal having a signal strength exceeding a threshold power level. This RF signal of sufficient signal strength (e.g., of sufficient power) may be referred to herein as a wake-up signal. Thus, in response to receiving the wake-up signal, the green AP 115 may transition from the unpowered state 505 to the power-up state 510.

The power-up state 510 is characterized by the radio transceiver 425 being activated (e.g., powered up). Further, while in the power-up state 510, the processor 405, the input device 415, the display 420, and the network interface 430 are also activated. The green AP 115 is detectable by the remote units 105 only when it is in the power-up state 510. Further, the green AP 115 can only transfer data to the remote units 105 when it is in the power-up state 510.

In some embodiments, the green AP 115 will query the macro base unit 110 for a wake-up confirmation before transitioning to the power-up state 510. For example, the green AP 115 may activate the network interface 430 (and, optionally, the processor 405) in order to transmit the query the base unit requesting a wake-up confirmation message in response to receiving a wake-up signal (e.g., an RF signal on the second uplink channel with a signal strength exceeding the threshold power level). If the macro base unit 110 responds with a wake-up confirmation message, then the green AP 115 completes the transition to the power-up state 510. Otherwise, if the macro base unit 110 does not respond with a wake-up confirmation message (e.g., a negative response is received or no response is received within a timeout period), then the green AP 115 may transition to the diagnostic state 515 or, alternatively, return to the unpowered state 505. In one embodiment, upon receiving a wake-up signal while in the unpowered state 505, the green AP 115 may transition to the diagnostic state 515 in order to query the macro base unit 110 for a wake-up confirmation before transitioning to the power-up state 510.

The diagnostic state 515 is characterized by the processor 405 being activated while the radio transceiver 425 is deactivated. As an example, the processor 405 may perform a diagnostic routine on another component of the green AP 115, such as the wake-up circuit 427. Thus, the green AP 115 consumes less power while in the diagnostic state 515 that while in the power-up state 510. In some embodiments, the network interface 430 may be powered up when the green AP 115 is in the diagnostic state 515. For example, the processor 405 may control the network interface 430 to query a macro base unit 110 without powering up the main radio transceiver 425. In one embodiment, the network interface 430 may query the macro base unit 110 for a wake-up confirmation message while in the diagnostic state 515. In another embodiment, the network interface 430 may query the macro base unit 110 for a missed wake-up message. While in the diagnostic state 515, the green AP 115 may perform self-diagnostics and adjust configurations of the wake-up circuit 427.

In one embodiment, the green AP 115 may transition to the diagnostic state 515 in response to detecting a wake-up signal and not receiving a wake-up confirmation message from the macro base unit 110 (e.g., due to receiving no response from the macro base unit 110 or receiving a negative confirmation message from the macro base unit 110). In this scenario, not receiving the wake-up confirmation message may indicate that the wake-up circuit 427 is falsely detecting a wake-up signal (e.g., due to radio interference from adjacent cells).

Accordingly, the processor 405 may adjust a configuration of the wake-up circuit 427 (e.g., adjust a wake-up configuration) while in the diagnostic state 515 and in response to not receiving the wake-up confirmation message. In certain embodiments, adjusting the wake-up configuration may include adjusting the threshold power level to which a signal on the second uplink channel is compared, when determining whether to transition from the unpowered state 505 to the power-up state 510. Additionally, the processor 405 may perform a diagnostic check on the wake-up circuit 427 and/or update reliability statistics pertaining to the wake-up circuit 427. The green AP 105 may then transition from the diagnostic state 515 to the unpowered state 505.

In another embodiment, the green AP 115 may periodically transition to the diagnostic state 515 (e.g., at a predefined intervals) in order to query the macro base unit 110 for a missed wake-up message. While in the diagnostic state 515, the green AP 115 may activate the network interface 430, without activating the radio transceiver 425, and query the macro base unit 110 for a missed wake-up message. The macro base unit 110 responds with a missed wake-up message if the green AP 115 failed to respond to a wake-up signal (e.g., since the last missed wake-up message query). If the green AP 115 receives a missed wake-up message, indicating a false rejection and/or failed detection of a wake-up signal, then the processor 405 may perform a diagnostic check on the wake-up circuit 427. Additionally, the processor 405 may adjust a configuration of the wake-up circuit 427 (e.g., adjust the threshold power level for transitioning from the unpowered state 505 to the power-up state 510) and/or update reliability statistics pertaining to the wake-up circuit 427. Otherwise, if the macro base unit 110 does not send a missed wake-up message (e.g., if the macro base unit 110 sends a negative response to the missed wake-up the message query), then the green AP 115 may transition from the diagnostic state 515 to the unpowered state 505.

In some embodiments, the green AP 115 may identify a problem with the wake-up circuit 427 while in the diagnostic state 515. The green AP 115 may then transition to the power-up state 510 and indicate the problematic wake-up circuit 427 to the macro base unit 110. In certain embodiments, the macro base unit 110 may signal to the green AP 115 to remain in the power-up state 510 (so as to be discoverable by the remote units 105). In other embodiments, the macro base unit 110 may signal to the green AP 115 to transition to the unpowered state 505 (e.g., until repairs are made to the wake-up circuit 427). In one embodiment, the green AP 115 identifies a problem with the wake-up circuit 427 due to a failed the diagnostic check. In another embodiment, the green AP 115 identifies a problem with the wake-up circuit 427 based on the reliability statistics pertaining to the wake-up circuit 427. For example, the wake-up circuit 427 may fail to detect the wake-up signal for some number of times over a predetermined number of attempts.

Figure 5B:
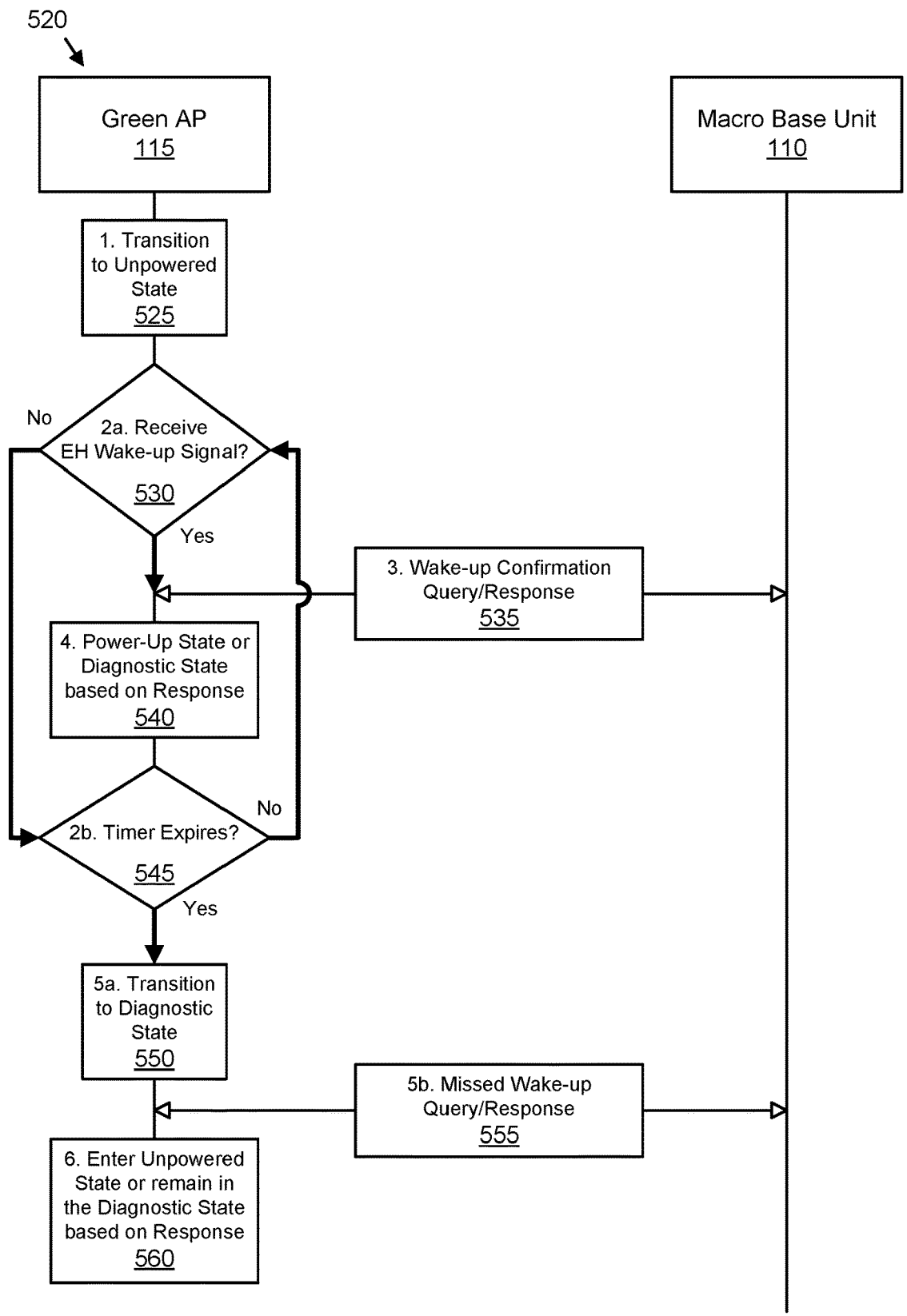
FIG. 5B is a block diagram illustrating one embodiment of a procedure used for offloading traffic to green access points in a wireless communication system.

FIG. 5B illustrates one embodiment of a procedure to offload traffic to a green access point in a wireless communication system 520. The wireless communication system 520 includes a green AP 115 and a macro base unit 110, which may be substantially as described above with reference to FIGS. 1, 3, 4, and 5A. As shown, the green AP 115 transitions 525 to the unpowered state 505. The green AP 115 may transition 525 to the unpowered state 505 after a threshold period of radio transceiver inactivity (e.g., after 5 minutes without serving a remote unit 105 via the radio transceiver 425). Alternatively, the green AP 115 may transition 525 to the unpowered state 505 in response to receiving a "power-down" command from the macro base unit 110.

The green AP 115 determines 530 whether an energy-harvesting wake-up signal is received. For example, the wake-up circuit 427 may receive, and harvest energy from, a signal on the second uplink channel. When the power level of the signal on the second uplink channel is above a threshold power level, then the wake-up circuit 427 indicates that a wake-up signal has been received.

In response to the green AP 115 determining 530 that an energy-harvesting wake-up signal is received, then the green AP 115 queries 535 the macro base unit 110 for a wake-up confirmation message via the wired link 125. Based on the wake-up confirmation response received from the macro base unit 110, the green AP 115 transitions 540 to either the power-up state 510 or the diagnostic state 515. In certain embodiments, the green AP 115 transitions to the diagnostic state 515 in order to query 535 the macro base unit 110 and either transitions to the power-up state 510 or remains in the diagnostic state 515, according to the response. In some embodiments, the wired link 125 may not be supported and the green AP 115 skips querying 535 the macro base unit 110, instead transitioning 540 to the power-up state 515 in response to determining 530 that an energy-harvesting wake-up signal is received.

If the macro base unit 110 responds with a wake-up confirmation message (e.g., the green AP 115 receives a positive response) then the green AP 115 transitions 540 to the power-up state 510. While in the power-up state 510, the green AP 115 may connect to one or more networks, including the radio access network, the packet core network 130, and/or the packet data network 135. Also while in the power-up state 510, the green AP 115 becomes detectable by remote units 105 and may establish connections with one or more remote units 105 that are within range of the green AP 115. As discussed above, the green AP 115 may transition from the power-up state 510 to the unpowered state 505 after a predetermined period of inactivity (e.g., of the radio transceiver 425) or in response to a command from the macro base unit 110.

Otherwise, if the macro base unit 110 does not respond with a wake-up confirmation message (e.g., the green AP 115 receives a negative response), then the green AP 115 transitions 540 to (or remains in) the diagnostic state 515. Additionally, if the macro base unit 110 does not respond with a wake-up confirmation message, then the green AP 115 identifies that false detection of the energy-harvesting wake-up signal has occurred and the green AP 115 (e.g., while in the diagnostic state 515) performs a diagnostic check on the wake-up circuit 427, updates reliability statistics for the wake-up circuit 427, and/or adjusts the threshold power level for determining whether an energy-harvesting wake-up signal has been received.

In response to the green AP 115 determining 530 that an energy-harvesting wake-up signal is not received, then the green AP 115 determines 545 whether a timer has expired, the timer measuring the predefined interval for checking for missed wake-up signals. If the timer has not expired, then the green AP 115 returns to determining 530 whether an energy-harvesting wake-up signal is received. Otherwise, in response to determining 545 that the timer expired, the green AP 115 transitions 550 to the diagnostic state 515. While in the diagnostic state 515, the green AP 115 queries 550 the macro base unit 110 for a missed wake-up message. As discussed above, the missed wake-up message indicates that the wake-up circuit 427 has either falsely rejected an energy-harvesting wake-up signal or failed to receive the energy-harvesting wake-up signal. At 560, the green AP 115 either enters the unpowered state 505 or remains in the diagnostic state 515 based on the missed wake-up response received from the macro base unit 110.

If the macro base unit 110 responds with a missed wake-up message (e.g., the green AP 115 receives a positive response), then the green AP 115 remains in the diagnostic state 515. While in the diagnostic state 515 the green AP 115 may perform a diagnostic check on the wake-up circuit 427, up-to-date reliability statistics for the wake-up circuit 427, and/or adjust the threshold power level for determining whether an energy-harvesting wake-up signal has been received. Otherwise, if the macro base unit 110 does not respond with a missed wake-up message (e.g., the green AP 115 receives a negative response), then the green AP 115 transitions to the unpowered state 505. The green AP 115 may transition from the unpowered state 505 in response to either reception of an energy-harvesting wake-up signal or expiration of the timer.

Figure 6A:
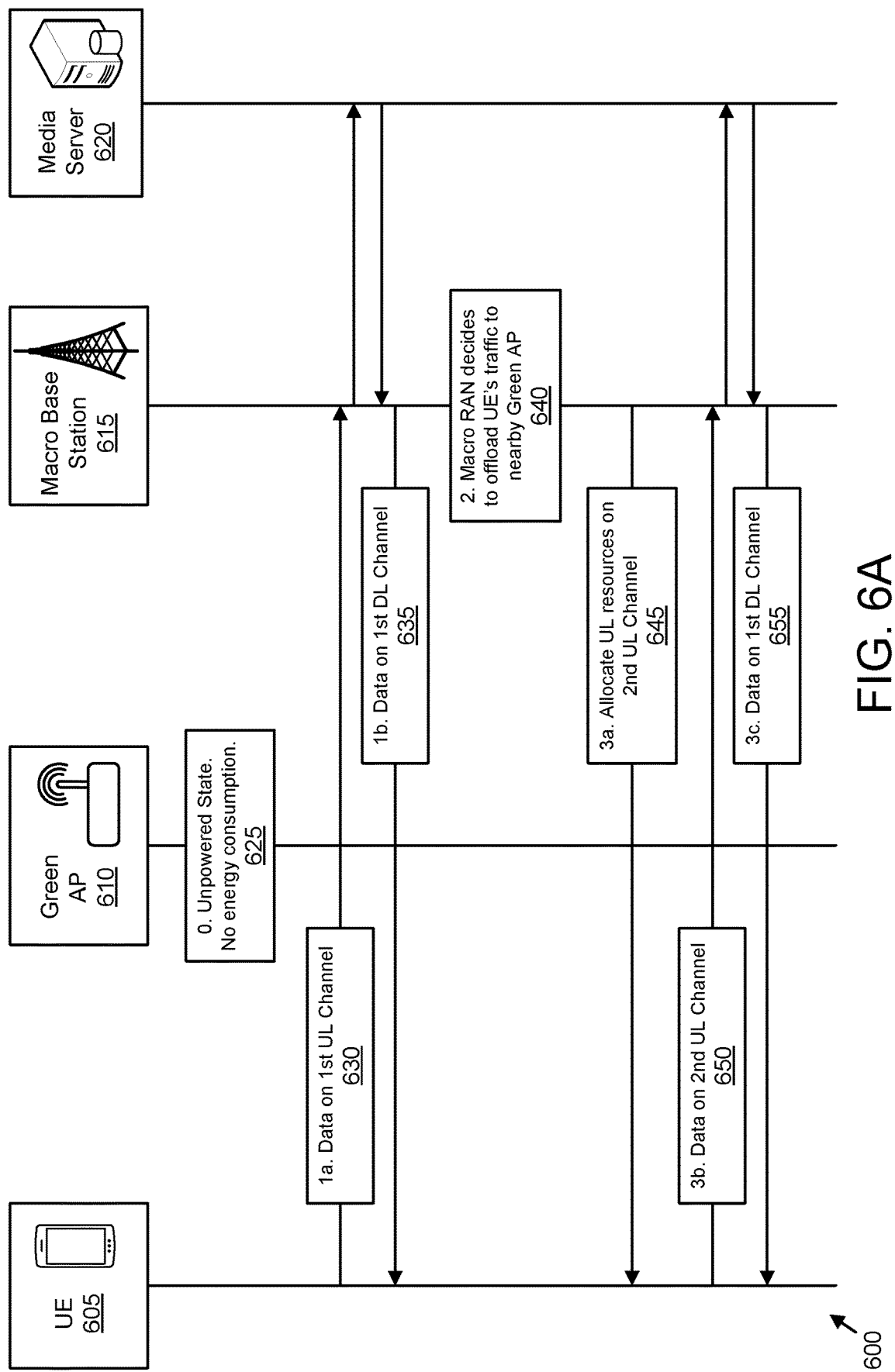
FIG. 6A is a block diagram illustrating another embodiment of a procedure used for offloading traffic to green access points in a wireless communication system

FIG. 6A is a schematic diagram illustrating procedures to offload traffic to a green access point in a communication system 600, according to embodiments of the disclosure. Communication system 600 includes a user equipment ("UE") 605, a green AP 610, a macro base station 615, and a media server 620. The UE 605 may be one embodiment of a remote unit 105, the green AP 610 may be one embodiment of a green AP 115, and the macro base station 615 may be one embodiment of a macro base unit 110, as described above with reference to FIGS. 1-5. The media server 620, in one embodiment, resides in a packet data network (e.g., the PDN 135) and serves data (e.g., media content) to the UE 605. The macro base station 615 may connect to the media server 620 via a packet core network (e.g., the PCN 130), while the green AP 610 may connect to the media server 620 either via the packet data network or the packet core network.

The green AP 610 initially exists 625 in an unpowered state (e.g., the unpowered state 505). The green AP 610 is not discoverable by the UE 605 while in the unpowered state. As discussed above, the green AP 610 does not consume energy while in the unpowered state, but may receive an energy-harvesting wake-up signal while in the unpowered state, the wake-up signal triggering a transition to a powered state (e.g., the power-up state 510).

The green AP 610 includes a wake-up receiver (e.g., a wake-up circuit 427) that powers up the green AP 610 when it receives enough RF energy on a specific radio channel (e.g., on an activation channel). In the communication system 600, the activation channel is a second uplink channel used in the RAN. Thus, the green AP 610 harvests energy from signals on the second uplink channel and activates (e.g., transitions to the power-up state 510) in response to signals received on the second uplink channel containing a threshold amount of power.

The UE 605 is initially connected to the macro base station 615. The UE 605 may establish data communication with the media server 620 via the macro base station 615. The macro base station 615 assigns radio resources on a first uplink channel (different than the specific radio channel used to activate the green AP 610) for conducting 630 uplink communication. In the communication system 600, the art of signal transmitted by the UE 605 on the first uplink channel does not activate the green AP 610, because it's wake-up receiver is configured to detect RF energy on a radio channel other than the first uplink channel (e.g., it is configured to detect RF energy on the second uplink channel). Additionally, the UE 605 receives 635 downlink data from the macro base station 615 on a first downlink channel. As depicted, the macro base station 615 relays data between the UE 605 and the media server 620.

At some instance, the macro base station 615 decides 640 to offload the data traffic of the UE 605 in response to an overload condition at the macro base station 615. In certain embodiments, the macro base station 615 tracks the location of the UE 605 and decides 640 to offload the data traffic of the UE 605 in response only when the UE 605 is within a coverage range of the green AP 610 (e.g., as determined based on the location of the UE 605). In another embodiment, the macro base station 615 may decide 640 to offload the data traffic of the UE 605 in response to other internal conditions at the macro base station 615.

The macro base station 615 is configured to know that the green AP 610 will power up in response to detecting RF energy on the second uplink channel. In some embodiments, the macro base station 615 contains a database containing locations of green access points (e.g., within the coverage area of the macro base station 615) and the specific radio channel used to activate each green access point. Thus, the macro base station 615 may access the database to determine the specific radio channel needed to activate the green AP 610.

In order to activate the green AP 610, the macro base station 615 allocates 645, to the UE 605, uplink resources on the second uplink channel (e.g., on the specific radio channel for activating the green AP 610). In one embodiment, the macro base station 615 allocates 645 the uplink resources using an existing radio resource management message, such as an RRC radio reconfiguration message. In response to the allocation 645 of uplink resources on the second uplink channel, the UE 605 transmits 650 uplink data (e.g., conducts uplink communication) on the second uplink channel. Note that the UE 605 continues to receive 655 downlink data on the first downlink channel, even though uplink communication has been moved to the second uplink channel.

FIG. 6B is a continuation of FIGS. 6A and further depicts procedures to offload traffic to a green access point in a communication system 600, according to embodiments of the disclosure. If the UE 605 is close enough to the green AP 610, then the RF energy of the uplink data transmitted 650 on the second uplink channel will have a power level greater than the threshold amount of power needed to wake up the green AP 610. Thus, the wake-up receiver (e.g., wake-up circuit 427) harvests 660 energy from the RF signal (e.g., uplink data) on the second uplink channel. In one embodiment, the wake-up receiver in the green AP 610 generates a power-up signal, when the energy of the RF signal on the second open channel exceeds a threshold amount of power.

In some embodiments, the green AP 610 is configured to query 665 the macro base station 615 for a wake-up confirmation message. For example, the green AP 610 may operate in an "optimum reliability" mode wherein green AP 610 collects wake-up receiver reliability statistics and adjusts a wake-up receiver configuration (e.g., the threshold amount of power needed to wake the green AP 610) based on feedback from the macro base station 615. Accordingly, the green AP 610 queries 665 the macro base station 615 whether it has requested the green AP 610 to wake-up (e.g., by querying 665 for a wake-up confirmation message).

The green AP 610 enters 670 the power-up state in response to receiving the wake-up confirmation from the macro base station 615. While in the power-up state, the green AP 610 commences normal radio operations and is discoverable by the UE 605. For example, the green AP 610 may transmit a beacon signal detectable by nearby devices, such as the UE 605, while in the power-up state. Otherwise, if the green AP 610 does not receive a wake-up confirmation, then the green AP 610 may reduce the sensitivity of the wake-up receiver, update wake-up receiver reliability statistics, and return to the unpowered state, as discussed above.

The UE 605 detects 675 the green AP 610 and connects 680 to the green AP 610. For example, the UE 605 may receive the beacon signal of the green AP 610 and connect to the green AP 610. The UE 605 may further be configured for data communications via green access points, such as the green AP 610. Such configuration may be provisioned using access network discovery and selection policies (ANDSF policies) sent to the UE 605. Accordingly, the UE 605 may redirect 685 its data traffic from the macro base station 615 to the newly discovered green AP 610. As depicted, the UE 605 resumes 690 data communications with the media server 620 via the green AP 610. In some embodiments, the UE 605 transfers to the green AP 610 all of its data traffic, according to its ANDSF policies. In other embodiments, the UE 605 may transfer only a part of its data traffic to the green AP 610, according to its ANDSF policies.

In some embodiments, the UE 605 sends uplink data to the green AP 610 over the first uplink channel and receives downlink data from the green AP 610 over the first downlink channel. In other embodiments, the UE 605 may send uplink data to the green AP 610 over a third uplink channel and may receive downlink data from the green AP 610 over a second downlink channel, wherein the third uplink channel is a different RF channel from the first and second uplink channels and wherein the second downlink channel is different RF channel from the first downlink channel.

Figure 7:
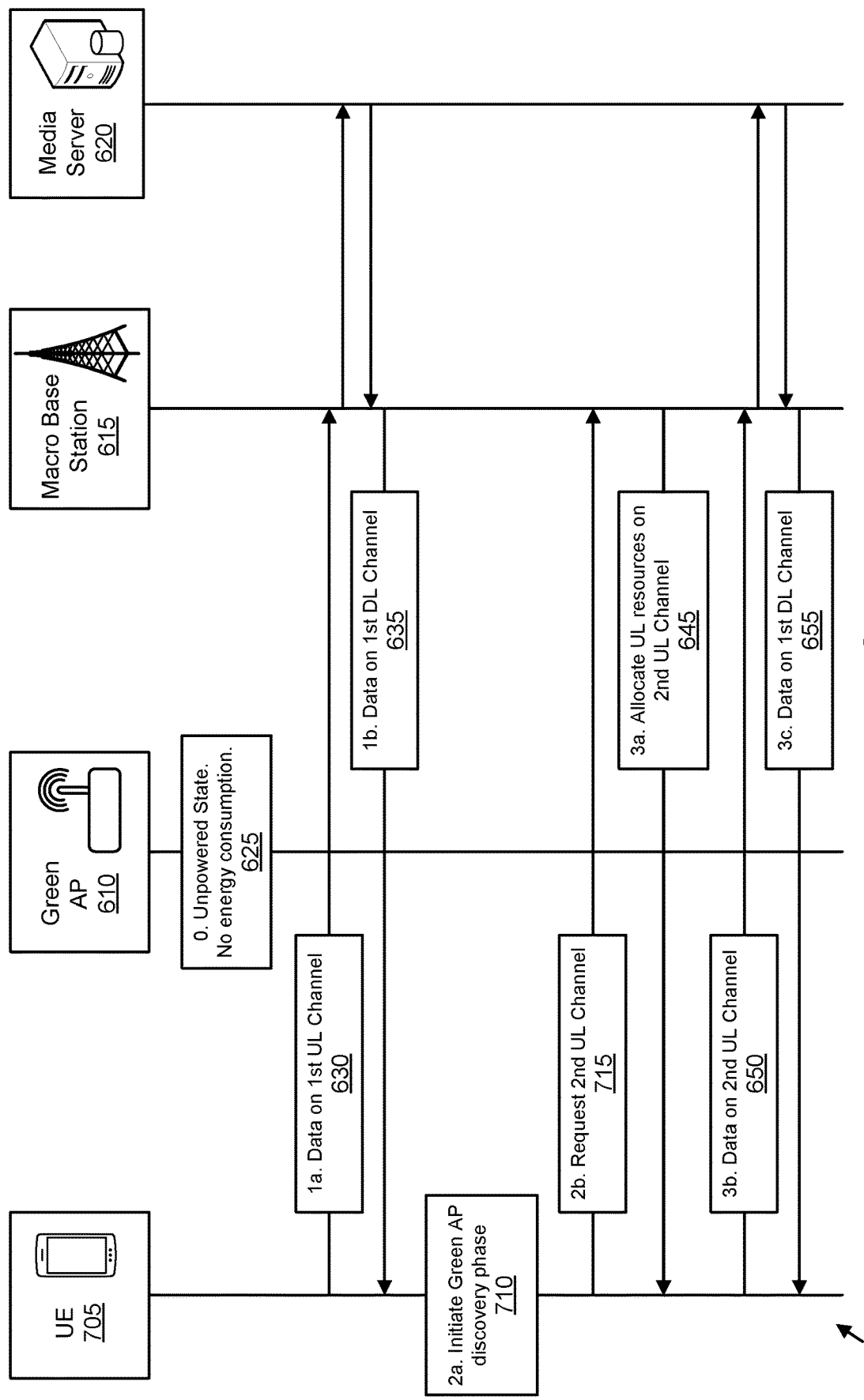
FIG. 7 is a block diagram illustrating another embodiment of a procedure used for offloading traffic to green access points in a wireless communication system.

FIG. 7 is a schematic diagram illustrating alternative procedures to offload traffic to a green access point in a communication system 700, according to embodiments of the disclosure. The procedures shown in FIG. 7 are alternatives to the procedure shown in FIG. 6A. The communication system 700 may be substantially similar to the communication 600 and may a green AP 610, a macro base station 615, and a media server 620 as described above. The communication system 700 further includes a UE 705, which may be one embodiment of the remote unit 105 discussed above with reference to FIGS. 1-2.

In the communication system 700, the green AP 610 initially exists 625 in an unpowered state. As discussed above, the green AP 610 is configured to activate in response to receiving at least a threshold amount of RF energy on a specific radio channel (e.g., the second uplink channel). Additionally, the UE 705 initially sends 630 uplink data on a first uplink channel and receives 635 downlink data on a first downlink channel, the first uplink channel being different than the second uplink channel activation channel (e.g., different than the activation channel for the green AP 610).

As depicted, the UE 705 initiates 710 a green access point discovery phase. In some embodiments, the UE 705 initiates the green access point discovery phase based on location information. For example, the UE 705 may include a location sensor 230 (e.g., a satellite positioning system receiver) and a green access point database containing locations of green access points 115. Thus, the UE 705 may initiate 710 the green access point discovery phase in response to the UE 705 determining that a green access point 115 is nearby (e.g., determining that its current location is within the coverage area of a green access point 115).

In other embodiments, the UE 705 may initiate 710 the green access point discovery phase periodically in order to discover new green access points 115 that are not in the green access point database. In one embodiment, the green access point database may be provisioned by the communication system 700. In another embodiment, the UE 705 may generate the green access point database by storing information of discovered green access points 115. In a further embodiment, 705 may update the green access point database as it discovers green access points 115.

In response to initiating 710 the green access point discovery phase, the UE 705 requests 715 allocation of radio resources on the second uplink channel. In some embodiments, the UE 705 identifies an activation channel for the green AP 610 and requests radio resources on a specific second uplink channel (e.g., on the activation channel). In other embodiments, the communication system 700 may have a dedicated activation channel (e.g., second uplink channel) for all green access points, such that the UE only needs to request uplink resources on the second uplink channel.

The macro base station 615 then allocates 645 uplink resources on the second uplink channel, wherein the UE 705 transmits 650 uplink data on the second uplink channel while receiving 655 downlink data on the first downlink channel. As discussed above, the green AP 610 is activated by transmissions on the second uplink channel. Accordingly, the procedures to offload traffic to the green AP 610 in the communication system 700 continue to offload data traffic to using the procedures described above in relation with FIG. 6B.

Procedures of FIG. 7 are beneficial for networks where the location of the green AP 610 may change and/or for networks where location information of the green AP 610 is not accessible at the macro base station 615. For example, the green AP 610 may belong to a different operator then the macro base station 615. As another example, the green AP 610 may be a Wi-Fi access point operating independently of the macro base station 615. In such scenarios, the macro base station 615 may be unaware of a green access point near the UE 705. Accordingly, the UE 705 may initiate offloading data traffic to the green AP 610 based on its knowledge of the location of the green AP 610, without relying on information stored at the macro base station 615.

Figure 8:
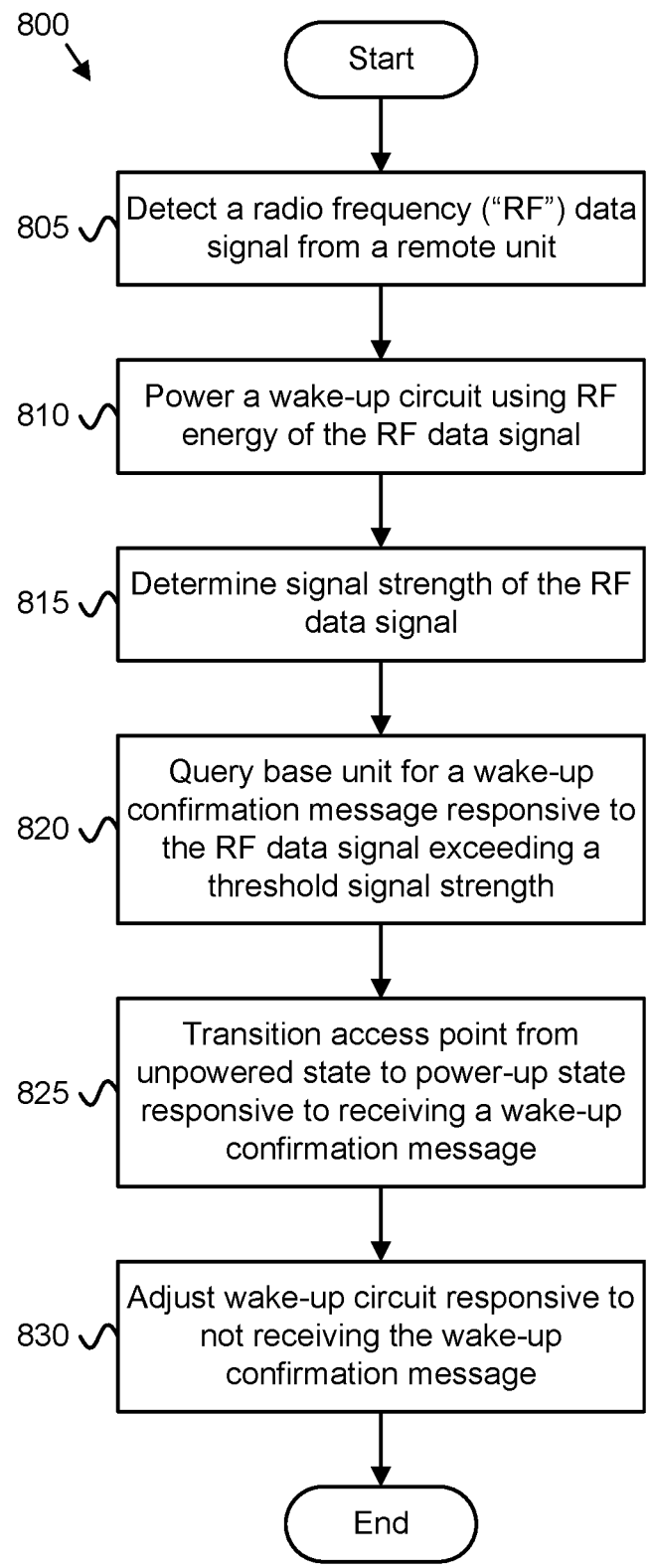
FIG. 8 is a schematic flow chart diagram illustrating one embodiment of a method for using RF energy on an uplink channel to transition an unpowered access point to a power-up state.

FIG. 8 is a schematic flow chart diagram illustrating a method 800 for using RF energy on an uplink channel to transition an unpowered access point to a power-up state, according to embodiments of the disclosure. In some embodiments, the method 800 is performed by an apparatus, such as the green access point 115. In certain embodiments, the method 800 may be performed by a processor executing program code, for example, a microcontroller, a microprocessor, a CPU, a GPU, an auxiliary processing unit, a FPGA, or the like.

The method 800 includes detecting 805 a radio frequency ("RF") data signal from a remote unit. In one embodiment, the wake-up circuit 427 detects 805 a RF data signal from a remote unit 105. In some embodiments, the RF data segment is sent on an activation channel, wherein the wake-up circuit 427 is configured to receive and harvest energy from RF signals on the activation channel. In further embodiments, the activation channel is a second uplink channel in a wireless communication system, wherein the remote unit transmits uplink data to a macro base unit using the second uplink channel.

The method 800 includes powering 810 the wake-up circuit using RF energy of the RF data signal. In one embodiment, the wake-up circuit 427 harvests the RF energy of the RF data signal. The method 800 also includes determining 815 a signal strength of the RF data signal. In one embodiment, the wake-up circuit 427 determines 815 the signal strength of the RF data signal.

The method 800 includes querying 820 a base unit for a wake-up confirmation message in response to the RF data signal exceeding a threshold the signal strength. In one embodiment, the processor 405 controls a network interface 430 to query 820 a macro base unit 110 for the wake-up confirmation message. In some embodiments, the macro base unit 110 responds with a wake-up confirmation message in response to the macro base unit 110 having allocated uplink resources on the second uplink channel to the remote unit 105. In further embodiments, the macro base unit 110 may respond with a negative confirmation message in response to the macro base unit 110 not having allocated any uplink resources on the second uplink channel remote unit 105.

The method 800 includes transitioning 825 an access point from an unpowered state to a power-up state in response to receiving a wake-up confirmation message from the base unit. In one embodiment, the processor 405 transitions 825 the green access point 115 from an unpowered state 505 to a power-up state 510 in response to receiving a wake-up confirmation message from the macro base unit 110. Additionally, the method 800 includes adjusting 830 a configuration of the wake-up circuit in response to not receiving the wake-up confirmation message and the method 800 ends.

In one embodiment, the processor 405 adjusts 830 the configuration of the wake-up circuit 427 in response to not receiving the wake-up confirmation message from the macro base unit 110. In some embodiments, adjusting 830 the configuration of the wake-up circuit includes reducing a sensitivity of the wake-up circuit. For example, the processor 405 may adjust a threshold signal strength for the wake-up circuit 427 in order to reduce the sensitivity of the wake-up circuit 427. In other embodiments, adjusting 830 the configuration of the wake-up circuit includes performing a diagnostic check on the wake-up circuit.

Figure 9:
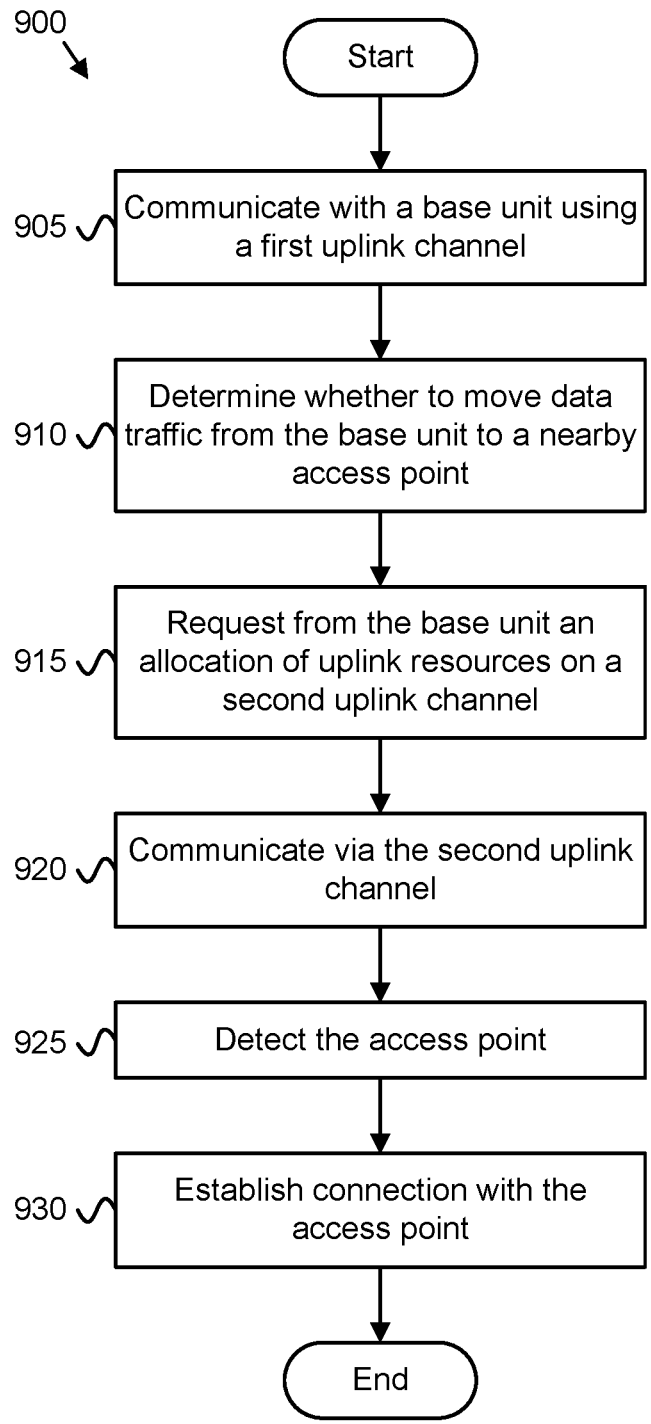
FIG. 9 is a schematic flow chart diagram illustrating one embodiment of a method for using RF energy on an uplink channel to transition an unpowered access point to a power-up state.

FIG. 9 is a schematic flow chart diagram illustrating a method 900 for using RF energy on an uplink channel to transition an unpowered access point to a power-up state, according to embodiments of the disclosure. In some embodiments, the method 900 is performed by an apparatus, such as the remote unit 105. In certain embodiments, the method 900 may be performed by a processor executing program code, for example, a microcontroller, a microprocessor, a CPU, a GPU, an auxiliary processing unit, a FPGA, or the like.

The method 900 includes communicating 905 with the base unit using a first uplink channel. In one embodiment, the radio transceiver 225 communicates 905 with the macro base unit 110 using the first uplink channel. The method 900 includes determining 910 whether to move data traffic from the base unit to nearby access point. In one embodiment, the processor 205 determines 910 whether to move data traffic from the macro base unit 110 to a nearby green AP 115.

The method 900 includes requesting 915 allocation of uplink resources on a second uplink channel in response to determining 910 to move data traffic to the access point. In one embodiment, the processor 205 controls the radio transceiver 225 to request 915 allocation of uplink resources on the second uplink channel in response to the processor 205 determining 910 to move data traffic to the green AP 115. In certain embodiments, the access point (e.g., the green AP 115) transitions to a power-up state (e.g., the power-up state 510) after harvesting radio energy transmitted on the second uplink channel.

The method 900 includes communicating 920 using the second uplink channel in response to the base unit allocating uplink resources on the second uplink channel. In one embodiment, the radio transceiver 225 communicates 920 using the second uplink channel in response to the macro base unit 110 allocating uplink resources on the second uplink channel. The method 900 also includes detecting 925 the access point. In one embodiment, the processor 205 controls the radio transceiver 225 to detect 925 the green AP 115. In certain embodiments, the green AP 115 harvests RF energy from communication on the second uplink channel and transitions to a power-up state 510 in response to the RF energy on the second uplink channel exceeding a threshold power level. After transitioning to the power-up state 510, the green AP 115 may transmit a beacon signal, wherein the processor 205 detects 925 the green AP 115 in response to the radio transceiver 225 receiving the beacon signal.

The method 900 includes establishing 930 a connection with the access point and the method 500 ends. In one embodiment, the processor 205 controls the radio transceiver 225 to establish 930 a connection with the green AP 115 in response to detecting 925 the green AP 115. In certain embodiments, establishing 930 connection with the green AP 115 includes redirecting data communications from the macro base unit 110 to the green AP 115.

Figure 10:
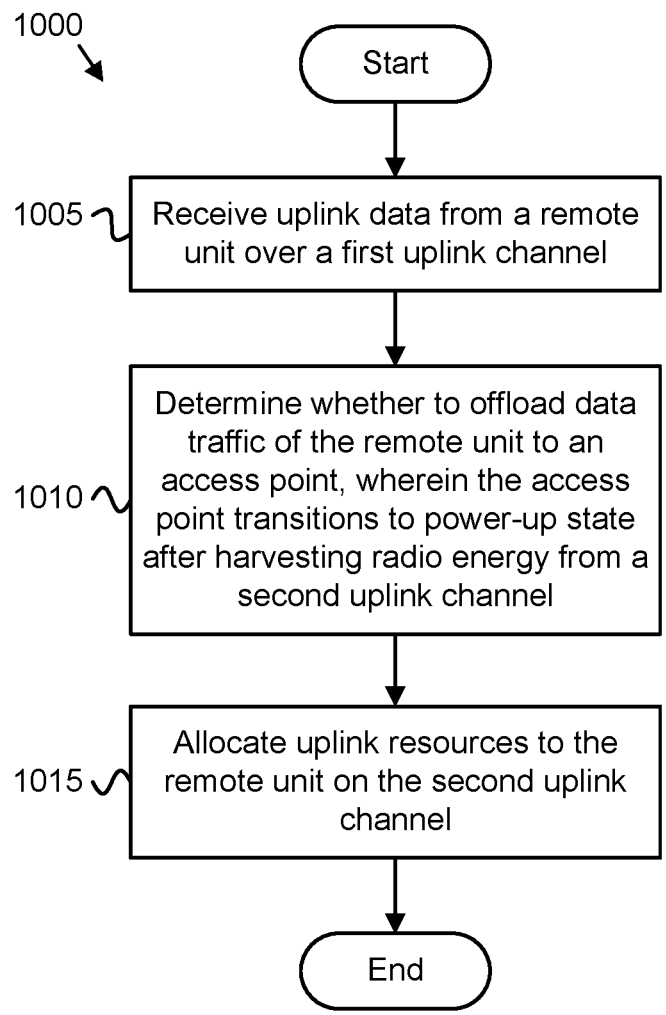
FIG. 10 is a schematic flow chart diagram illustrating one embodiment of a method for using RF energy on an uplink channel to transition an unpowered access point to a power-up state.

FIG. 10 is a schematic flow chart diagram illustrating a method 1000 for using RF energy on an uplink channel to transition an unpowered access point to a power-up state, according to embodiments of the disclosure. In some embodiments, the method 1000 is performed by an apparatus, such as the macro base unit 110. In certain embodiments, the method 1000 may be performed by a processor executing program code, for example, a microcontroller, a microprocessor, a CPU, a GPU, an auxiliary processing unit, a FPGA, or the like.

The method 1000 includes receiving 1005 uplink data from a remote unit over a first uplink channel. In one embodiment, the radio transceiver 325 receives 1005 uplink data from the remote unit 105 over the first uplink channel. The method 1000 may include determining 1010 whether to offload data traffic of the remote unit to an access point, wherein the access point transitions to a power-up state after harvesting radio energy from a second uplink channel. In one embodiment, the processor 305 determines 1010 whether to offload the data traffic of the remote unit 105 to a green AP 115, wherein the green AP 115 transitions from an unpowered state 505 to a power-up state 510 after harvesting radio energy from the second uplink channel.

The method 1000 includes allocating 1015 uplink resources to the remote unit on the second uplink channel and the method 1000 ends. In one embodiment, the processor 305 allocates uplink resources to the remote unit 105 on the second uplink channel in response to the processor 305 determining to offload the data traffic of the remote unit 105 to the green AP 115. In some embodiments, the remote unit 105 may communicate uplink data over the second uplink channel in response to the macro base unit 110 allocating 1015 uplink resources on the second uplink channel.

As discussed above, the green AP 115 may transition to the power-up state after harvesting radio energy on the second uplink channel. The remote unit 105 may detect the green AP 115 after the green AP 115 transitions to power-up state. The remote unit 105 may further establish a connection with the green AP 115. Also as discussed above, the remote unit 105 may redirect traffic from the base unit 110 to the green AP 115.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a wake-up circuit that:
   detects a radio frequency ("RF") data signal from a remote unit;
   harvests RF energy of the RF data signal; and
   determines a signal strength of the RF data signal; and
   a controller that:
   activates a network interface to query a base unit for a wake-up confirmation message in response to the signal strength of the RF data signal exceeding a threshold power level;
   adjusts a wake-up configuration in response to not receiving the wake-up confirmation message; and
   transitions the apparatus from an unpowered state to a power-up state in response to receiving the wake-up confirmation message.

2. The apparatus of claim 1, wherein adjusting a wake-up configuration in response to not receiving the wake-up confirmation message comprises:
   adjusting the threshold power level.

3. The apparatus of claim 1, wherein the controller further:
   activates the network interface to query, at predefined intervals, the base unit for a missed wake-up message, the apparatus querying the base unit while in a diagnostic state; and
   adjusts a wake-up configuration in response to receiving a missed wake-up message from the base unit.

4. The apparatus of claim 3, wherein the controller adjusting a wake-up configuration in response to receiving a missed wake-up message comprises the controller performing a diagnostic check on the wake-up circuit.

5. The apparatus of claim 3, wherein the controller adjusting a wake-up configuration in response to receiving a missed wake-up message comprises the controller adjusting the threshold power level.

6. The apparatus of claim 1, wherein the controller further:
   detects a failure state of the wake-up circuit;
   controls the network interface to transmit an error state message to a base unit;
   controls the network interface to receive a response from the base unit; and
   sets an operation state based on the response.

7. The apparatus of claim 6, wherein the controller detecting the failure state of the wake-up circuit comprises the controller:
   performing a diagnostic check on the wake-up circuit; and
   determining the failure state based on a result of the diagnostic check.

8. The apparatus of claim 6, wherein the controller detecting the failure state of the wake-up circuit comprises the controller:
   tracking a number of missed wake-up signals over a predetermined amount of wake-up attempts; and
   determining the failure state of the wake-up circuit in response to the number of missed wake-up signals over a predetermined amount of wake-up attempts exceeding a threshold amount.

9. A method comprising:
   detecting a radio frequency ("RF") data signal from a remote unit;
   powering a wake-up circuit using RF energy of the RF data signal;
   determining, by the wake-up circuit, a signal strength of the RF data signal;
   querying a base unit for a wake-up confirmation message in response to the RF data signal exceeding a threshold signal strength;
   transitioning an access point from an unpowered state to a power-up state in response to receiving a wake-up confirmation message from the base unit; and
   adjusting a configuration of the wake-up circuit in response to not receiving the wake-up confirmation message.

10. The method of claim 9, wherein adjusting a wake-up configuration in response to not receiving the wake-up confirmation message comprises:
    adjusting the threshold signal strength.

11. The method of claim 9, further comprising:
    querying, at predefined intervals, the base unit for a missed wake-up message, wherein querying the base unit comprises querying the base unit while in a diagnostic state; and
    adjusting a wake-up configuration in response to receiving a missed wake-up message from the base unit.

12. The method of claim 11, wherein adjusting a wake-up configuration in response to receiving a missed wake-up message comprises performing a diagnostic check on the wake-up circuit.

13. The method of claim 11, wherein adjusting a wake-up configuration in response to receiving a missed wake-up message comprises adjusting the threshold signal strength.

14. The method of claim 9, further comprising:
    detecting a failure state of the wake-up circuit;
    transmitting an error state message to the base unit;
    receiving a response from the base unit; and
    setting an operation state of the access point based on the response.

15. The method of claim 14, wherein detecting the failure state of the wake-up circuit comprises:
    performing a diagnostic check on the wake-up circuit; and
    determining the failure state based on a result of the diagnostic check.

16. The method of claim 14, wherein detecting the failure state of the wake-up circuit comprises:
    tracking a number of missed wake-up signals over a predetermined amount of wake-up attempts; and
    determining the failure state of the wake-up circuit in response to the number of missed wake-up signals over a predetermined amount of wake-up attempts exceeding a threshold amount.

17. The apparatus of claim 1, wherein the RF data signal is received on an activation channel corresponding to the apparatus.

18. The apparatus of claim 1, wherein the wake-up circuit detecting the RF data signal and harvesting RF energy of the RF data signal occur while the apparatus is in the unpowered state.

19. The method of claim 9, wherein the RF data signal is received on an activation channel corresponding to the access point.

20. The method of claim 9, wherein detecting the RF data signal and powering the wake-up circuit using RF energy of the RF data signal occur while the access point is in the unpowered state.

* * * * *